(12) United States Patent
Kang et al.

(10) Patent No.: US 12,737,461 B2
(45) Date of Patent: Sep. 15, 2026

(54) AI-BASED FILE MALICIOUSNESS CLASSIFICATION WITH AN EXPLANATION OF REASONING

(71) Applicant: Microsoft Technology Licensing, LLC, Redmond, WA (US)

(72) Inventors: Li Kang, Sammamish, WA (US); Heon Joon Choi, Seattle, WA (US); Shauharda Khadka, Seattle, WA (US); Ankit Garg, Seattle, WA (US); Jayronn Christian Sulit Bucu, Bellevue, WA (US); Miranda Nicole McClellan, Dallas, TX (US); Karen Lavi, Seattle, WA (US); Siddharth Pavithran, Redmond, WA (US); Niveditha Shenoy Badiadka, Bothell, WA (US); Srishti Agarwal, Sunnyvale, CA (US); Tanmay Arun Ganacharya, Kirkland, WA (US); Geoffrey Lyall McDonald, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 18/593,851

(22) Filed: Mar. 1, 2024

(65) Prior Publication Data

US 2025/0278485 A1 Sep. 4, 2025

(51) Int. Cl.
*G06F 21/00* (2013.01)
*G06F 21/56* (2013.01)
(Continued)

(52) U.S. Cl.
CPC ............... *G06F 21/56* (2013.01); *G06N 5/04* (2013.01); *G06N 20/00* (2019.01)

(58) Field of Classification Search
CPC ........... G06F 21/56; G06N 5/04; G06N 20/00
See application file for complete search history.

(56) References Cited

U.S. PATENT DOCUMENTS 11,552,962 B2 * 1/2023 Saxe ................. G06F 18/23213
11,914,709 B2 * 2/2024 Albero .................. G06F 21/566
(Continued)

FOREIGN PATENT DOCUMENTS

WO 2024033607 A1 2/2024

OTHER PUBLICATIONS

International Search Report and Written Opinion received for PCT Application No. PCT/US2025/010368, mailed on Apr. 3, 2025, 12 pages.
(Continued)

*Primary Examiner* — Don G Zhao
(74) *Attorney, Agent, or Firm* — Wade IP Law PLLC

(57) ABSTRACT

Techniques are described herein that are capable of performing AI-based maliciousness classification with an explanation of reasoning. An AI model is caused to classify a file in a malicious class or a non-malicious class and to provide an explanation that describes reasoning used by the AI model for the classification by providing an AI prompt together with the file as inputs to the AI model. The AI prompt requests that the AI model choose between the malicious class and the non-malicious class and further requests the explanation. A response to the AI prompt is received from the AI model. The response includes an indication of a selected class in which the AI model classifies the file and further includes the explanation. The explanation is stored and/or is provided to the user via a user interface, and a security operation is performed with regard to the file.

22 Claims, 6 Drawing Sheets

(51) Int. Cl.
*G06N 5/04* (2023.01)
*G06N 20/00* (2019.01)

(56) References Cited

U.S. PATENT DOCUMENTS

| | | | | |
|---|---|---|---|---|
| 12,293,157 | B2 * | 5/2025 | Neagovici | G06F 40/30 |
| 12,321,831 | B1 * | 6/2025 | Karpman | G06N 20/00 |
| 12,395,522 | B2 * | 8/2025 | Murphy | H04L 63/1416 |
| 2018/0103052 | A1 | 4/2018 | Choudhury | |
| 2019/0258965 | A1 | 8/2019 | Lukas | |
| 2020/0320192 | A1 * | 10/2020 | Ma | G06N 20/20 |
| 2023/0060207 | A1 * | 3/2023 | Sirineni | H04L 67/60 |
| 2023/0208872 | A1 * | 6/2023 | Fitzgerald | G06F 40/20 726/23 |
| 2023/0222220 | A1 * | 7/2023 | Fitzgerald | G06F 21/51 726/25 |
| 2023/0401314 | A1 * | 12/2023 | Healy | G06F 21/56 |
| 2024/0054233 | A1 * | 2/2024 | Ohayon | G06F 21/577 |
| 2024/0296177 | A1 * | 9/2024 | Gardner | G06F 40/279 |
| 2024/0430363 | A1 * | 12/2024 | Neate | H04M 3/53366 |
| 2025/0005901 | A1 * | 1/2025 | Cha | G06V 10/74 |
| 2025/0016185 | A1 * | 1/2025 | Han | G06F 21/56 |
| 2025/0028825 | A1 * | 1/2025 | Kim | G06F 21/552 |
| 2025/0117476 | A1 * | 4/2025 | Grobman | G06F 21/554 |
| 2025/0165893 | A1 * | 5/2025 | Silcock | G06Q 10/0633 |
| 2025/0182055 | A1 * | 6/2025 | Goodman | G06Q 10/103 |
| 2025/0201234 | A1 * | 6/2025 | Singh | G06T 13/40 |
| 2025/0238340 | A1 * | 7/2025 | Jain | G06F 40/35 |
| 2025/0238426 | A1 * | 7/2025 | Mori | G06F 16/285 |
| 2025/0252775 | A1 * | 8/2025 | Covell | G06V 10/764 |
| 2025/0258874 | A1 * | 8/2025 | Ahmadia | G06F 16/38 |
| 2025/0272608 | A1 * | 8/2025 | Mishra | G06N 20/00 |
| 2025/0276216 | A1 * | 9/2025 | Mohrman | G01C 19/5776 |

OTHER PUBLICATIONS

Ciucă, et al., "Galactic ChitChat: Using Large Language Models to Converse with Astronomy Literature", arXiv preprint arXiv:2304.05406, 2023, 3 pages.

Gibert, et al., "A Hierarchical Convolutional Neural Network for Malware Classification", In International Joint Conference on Neural Networks (IJCNN), IEEE, 2019, pp. 1-8.

Huang, et al., "MtNet: A Multi-task Neural Network for Dynamic Malware Classification", Detection of Intrusions and Malware, and Vulnerability Assessment: In 13th International Conference, DIMVA 2016, San Sebastián, Spain, Jul. 7-8, 2016, Proceedings 13. Springer International Publishing, 2016, 20 Pages.

Kalash, et al., "Malware Classification with Deep Convolutional Neural Networks", In 9th IFIP International Conference on New Technologies, Mobility and Security (NTMS), IEEE, 2018, pp. 1-5.

Khan,, et al., "Malware Classification Framework Using Convolutional Neural Network", In International Conference on Cyber Warfare and Security (ICCWS). IEEE, 2020, 7 Pages.

Kinable, et al., "Malware Classification Based on Call Graph Clustering", In Journal in Computer Virology, vol. 7, Feb. 3, 2011, pp. 233-245.

Kolosnjaji, et al., "Empowering Convolutional Networks for Malware Classification and Analysis", In International Joint Conference on Neural Networks (IJCNN), IEEE, 2017, pp. 3838-3845.

Kornish, et al., "Malware Classification Using Deep Convolutional Neural Networks", In Applied Imagery Pattern Recognition Workshop (AIPR), IEEE, 2018, pp. 1-6.

Lewis, et al., "Retrieval-Augmented Generation for Knowledge-Intensive NLP Tasks", In 34th Conference on Neural Information Processing Systems, 2020, 16 pages.

Martinez-Romo, et al., "Web Spam Identification Through Language Model Analysis", In Proceedings of the 5th International Workshop on Adversarial Information Retrieval on the Web, 2009, 8 Pages.

Mehta, et al., "A Natural Language Processing Approach to Malware Classification", In Journal of Computer Virology and Hacking Techniques 2023, pp. 1-12.

Mijwil, Maad, et al., "ChatGPT: Exploring the Role of Cybersecurity in the Protection of Medical Information", Mesopotamian Journal of Cybersecurity, 2023, pp. 18-21.

Mimura, et al., "Towards Efficient Detection of Malicious VBA Macros with LSI", Proceedings of Advances in Information and Computer Security, In 14th International Workshop on Security, IWSEC, Tokyo, Japan, Aug. 28-30, 2019, pp. 168-185.

Phung, et al., "Detection of Malicious Javascript on an Imbalanced Dataset", Internet of Things, vol. 13, 2021, 100357, pp. 1-12.

Poudyal, et al., "A Multi-level Ransomware Detection Framework Using Natural Language Processing and Machine Learning", In 14th International Conference on Malicious and Unwanted Software MALCON. No. Oct. 2015. 2019, 8 Pages.

Ramos, et al., "Bayesian Optimization of Catalysts With in-context Learning", arXiv preprint arXiv:2304.05341, Apr. 11, 2023, 33 Pages.

Tang, et al., "Towards Fraudulent URL Classification with Large Language Model based on Deep Learning", In 4th International Conference on Computer Vision, Image and Deep Learning (CVIDL). IEEE, 2023, pp. 503-507.

Ucci, et al., "Survey of Machine Learning Techniques for Malware Analysis", Computers & Security, vol. 81, 2019, pp. 123-147.

Vasan, et al., "IMCFN: Image-Based Malware Classification Using Fine-Tuned Convolutional Neural Network Architecture", Computer Networks, vol. 171, 2020, 107138, 19 pages.

Zhang, et al., "Hybrid Sequence-based Android Malware Detection Using Natural Language Processing", In International Journal of Intelligent Systems, vol. 36, 2021, pp. 5770-5784.

* cited by examiner

FIG. 1

AI-BASED FILE MALICIOUSNESS CLASSIFICATION WITH AN EXPLANATION OF REASONING

BACKGROUND

Antivirus engines traditionally employ signature-based approaches to detect and classify malware. Signature-based approaches typically involve continuously scanning files and juxtaposing heuristic signatures of the files with known malware patterns. However, signature-based approaches have their limitations. Although signature-based approaches perform reasonably well when identifying previously encountered malware, such approaches often are unable to detect novel malware. This limitation stems from the reliance of the signature-based approaches on exact patterns or heuristics, which can allow contemporary polymorphic and homomorphic malware to evade detection through minor code modifications. Traditional machine learning approaches may be capable of capturing a wider spectrum of polymorphism within malicious files. However, the traditional machine learning approaches typically consume a substantial amount of time for feature extraction, feature selection, model selection, and hyper-parameter tuning.

Deep learning techniques have been employed to improve accuracy of malware classification. However, deep learning techniques are effectively black-box solutions that classify files with no further information regarding the classification. The lack of information associated with deep learning techniques is a disadvantage as compared to techniques that utilize human grading and may prevent the deep learning techniques from being employed at scale. Furthermore, safety-critical protection scenarios (e.g., government, healthcare, manufacturing) typically require accountability, which often leads to the use of human experts to classify the files in those scenarios. Relying on human experts for file classification is not a scalable strategy, which may leave the safety-critical protection scenarios vulnerable to malicious actors and campaigns.

SUMMARY

It may be desirable to use an artificial intelligence (AI) model to classify a file in a malicious class or a non-malicious class and to provide an explanation that describes reasoning used by the AI model in choosing the malicious class or the non-malicious class in which to classify the file. An AI model is a model that utilizes artificial intelligence to generate an answer that is responsive to an AI prompt (a.k.a. prompt) that is received by the AI model. The AI model may be an artificial general intelligence model. An artificial general intelligence model is an AI model (e.g., an autonomous AI model) that is configured to be capable of performing any task that an animal (e.g., a human) is capable of performing. In an example implementation, the artificial general intelligence model is capable of performing a task that surpasses the capabilities of an animal.

Artificial intelligence is intelligence of a machine (e.g., a computing system) and/or code (e.g., software and/or firmware), as opposed to intelligence of an animal (e.g., a human). An AI prompt indicates (e.g., specifies) a task that is to be performed by an AI model. Examples of an AI prompt include but are not limited to a zero-shot prompt, a one-shot prompt, and a few-shot prompt. A zero-shot prompt is a prompt for which the prompt and/or its corresponding contextual information, which are to be processed by the AI model, is not included in pre-trained knowledge of the AI model. A one-shot prompt is a prompt that includes a target prompt along with a single example prompt and a single example answer that is responsive to the single example prompt. The example prompt and the example answer provide guidance as to how the AI model is expected to respond to the target prompt. A few-shot prompt is a prompt that includes a target prompt along with multiple example prompts and multiple example answers that are responsive to the respective example prompts. The example prompts and the example answers provide guidance as to how the AI model is expected to respond to the target prompt.

An AI prompt may be a natural language prompt. A natural language prompt is a prompt that is written in a natural language. A natural language is a human language that has developed through use and repetition. For instance, the natural language may have developed naturally without conscious planning or premeditation. Examples of a natural language include English, French, Spanish, and Mandarin.

By providing an explanation that describes reasoning used by an AI model in choosing a malicious class or a non-malicious class in which to classify a file, the AI model may enable a user to understand the thought process behind the classification and to make more informed decisions. Having the explanation may eliminate a need for feature engineering that often is performed by a domain expert. Avoiding the use of the domain expert to classify the file may reduce a cost of classifying the file and may reduce an amount of time that is consumed to classify the file. The AI model may process unstructured telemetry regarding the file in plain English (e.g., with a relatively low amount of preprocessing) and classify the file while explaining the reasoning behind the classification. Model and feature selection may be performed independently without compromising visibility of the AI model.

Various approaches are described herein for, among other things, using an AI model to perform classification regarding maliciousness with an explanation of reasoning for the classification. In an example approach, an AI model is caused to classify a target file in a malicious class or a non-malicious class and to provide an explanation that describes reasoning used by the AI model in choosing the malicious class or the non-malicious class in which to classify the target file by providing an AI prompt together with the target file as inputs to the AI model. The AI prompt requests that the AI model choose between the malicious class and the non-malicious class in which to classify the target file and further requests the explanation that describes the reasoning used by the AI model in choosing the malicious class or the non-malicious class in which to classify the target file. The target file includes context regarding the AI prompt. A response to the AI prompt is received from the AI model. The response includes an indication of a selected class in which the AI model classifies the target file and further includes the explanation that describes the reasoning used by the AI model in choosing the selected class in which to classify the target file. The selected class is the malicious class or the non-malicious class. The explanation, which describes the reasoning used by the AI model in choosing the selected class in which to classify the target file, is stored and/or is provided to the user via a user interface. Based at least on (e.g., in response to or as a result of) the indication of the selected class in which the AI model classifies the target file, a security operation is performed with regard to the target file.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURESE

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 1 is a block diagram of an example AI-based classification explanation system in accordance with an embodiment.

Figure 2:
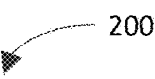
FIGS. 2-4 depict flowcharts of example methods for performing AI-based file maliciousness classification with an explanation of reasoning in accordance with embodiments.
Figure 2:
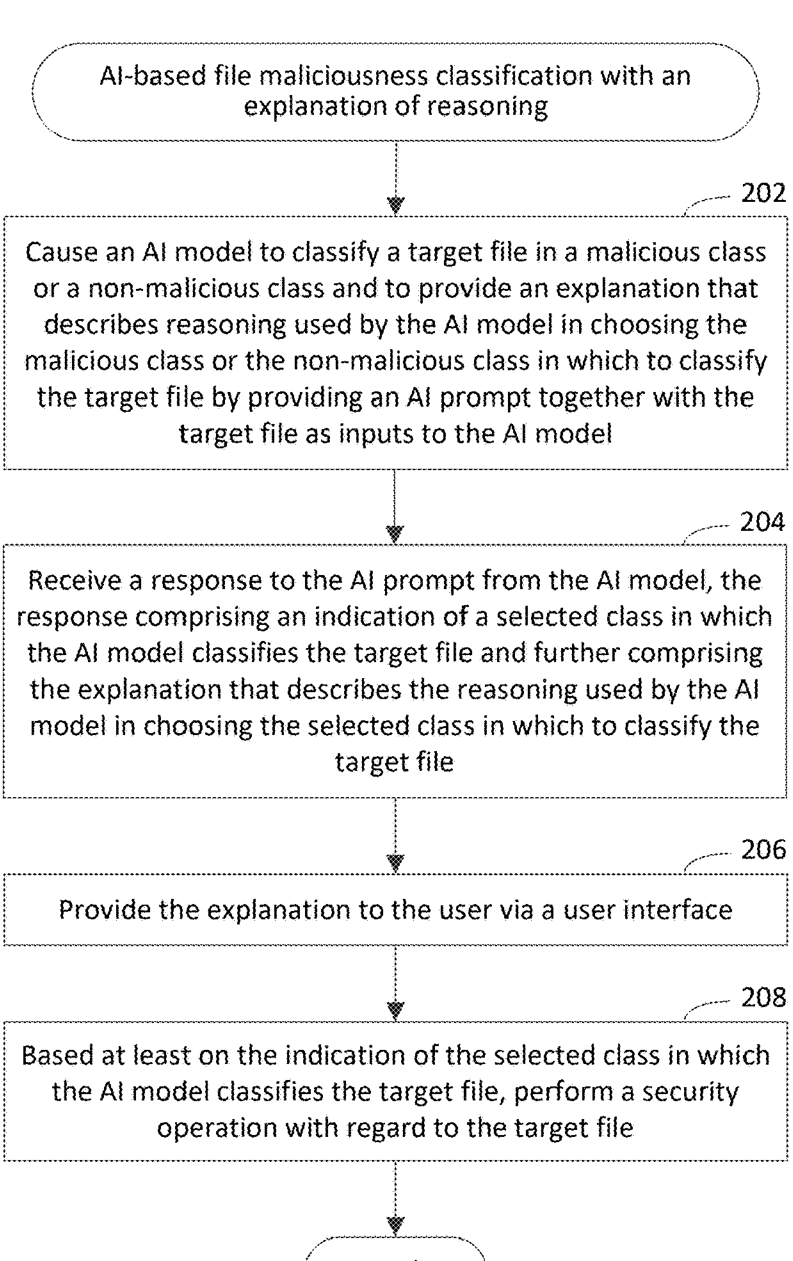

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

It may be desirable to use an artificial intelligence (AI) model to classify a file in a malicious class or a non-malicious class and to provide an explanation that describes reasoning used by the AI model in choosing the malicious class or the non-malicious class in which to classify the file. An AI model is a model that utilizes artificial intelligence to generate an answer that is responsive to an AI prompt (a.k.a. a prompt) that is received by the AI model. The AI model may be an artificial general intelligence model. An artificial general intelligence model is an AI model (e.g., an autonomous AI model) that is configured to be capable of performing any task that an animal (e.g., a human) is capable of performing. In an example implementation, the artificial general intelligence model is capable of performing a task that surpasses the capabilities of an animal.

Artificial intelligence is intelligence of a machine (e.g., a computing system) and/or code (e.g., software and/or firmware), as opposed to intelligence of an animal (e.g., a human). An AI prompt indicates (e.g., specifies) a task that is to be performed by an AI model. Examples of an AI prompt include but are not limited to a zero-shot prompt, a one-shot prompt, and a few-shot prompt. A zero-shot prompt is a prompt for which the prompt and/or its corresponding contextual information, which are to be processed by the AI model, is not included in pre-trained knowledge of the AI model. A one-shot prompt is a prompt that includes a target prompt along with a single example prompt and a single example answer that is responsive to the single example prompt. The example prompt and the example answer provide guidance as to how the AI model is expected to respond to the target prompt. A few-shot prompt is a prompt that includes a target prompt along with multiple example prompts and multiple example answers that are responsive to the respective example prompts. The example prompts and the example answers provide guidance as to how the AI model is expected to respond to the target prompt.

An AI prompt may be a natural language prompt. A natural language prompt is a prompt that is written in a natural language. A natural language is a human language that has developed through use and repetition. For instance, the natural language may have developed naturally without conscious planning or premeditation. Examples of a natural language include English, French, Spanish, and Mandarin.

By providing an explanation that describes reasoning used by an AI model in choosing a malicious class or a non-malicious class in which to classify a file, the AI model may enable a user to understand the thought process behind the classification and to make more informed decisions. Having the explanation may eliminate a need for feature engineering that often is performed by a domain expert. Avoiding the use of the domain expert to classify the file may reduce a cost of classifying the file and may reduce an amount of time that is consumed to classify the file. The AI model may process unstructured telemetry regarding the file in plain English (e.g., with a relatively low amount of preprocessing) and classify the file while explaining the reasoning behind the classification. Model and feature selection may be performed independently without compromising visibility of the AI model.

Example embodiments described herein are capable of using an AI model to perform classification regarding maliciousness with an explanation of reasoning for the classification. In an example approach, an AI model is caused to classify a target file in a malicious class or a non-malicious class and to provide an explanation that describes reasoning used by the AI model in choosing the malicious class or the non-malicious class in which to classify the target file by providing an AI prompt together with the target file as inputs to the AI model. The AI prompt requests that the AI model choose between the malicious class and the non-malicious class in which to classify the target file and further requests the explanation that describes the reasoning used by the AI model in choosing the malicious class or the non-malicious class in which to classify the target file. The target file includes context regarding the AI prompt. A response to the AI prompt is received from the AI model. The response includes an indication of a selected class in which the AI model classifies the target file and further includes the explanation that describes the reasoning used by the AI model in choosing the selected class in which to classify the target file. The selected class is the malicious class or the non-malicious class. The explanation, which describes the reasoning used by the AI model in choosing the selected class in which to classify the target file, is stored and/or is provided to the user via a user interface. Based at least on (e.g., in response to or as a result of) the indication of the selected class in which the AI model classifies the target file, a security operation is performed with regard to the target file.

Example techniques described herein have a variety of benefits as compared to conventional techniques for classifying a file with regard to maliciousness. For instance, the example techniques are capable of using AI to provide an explanation of why a file is classified as malicious or non-malicious. In the explanation, the AI may explain whether, how, and/or an extent to which each of multiple features (e.g., attributes) of the file weighs in favor of or against classifying the file as malicious or non-malicious. For example, the AI may assign a weight to each feature of the file such that the weight is based on (e.g., based at least on) the extent to which the feature weighs in favor of or against a particular classification (malicious or non-malicious) of the file.

The AI may calculate an overall confidence associated with classification of the file as malicious or non-malicious. For instance, the overall confidence may be based at least on weights that are assigned to the features of the file. By using AI, the example techniques may be capable of classifying a file as malicious or non-malicious more accurately, precisely, and/or reliably than conventional techniques. For instance, the example techniques may reduce a number of false positives in which a non-malicious file is classified as being malicious and/or increase a number of true positives in which a malicious file is classified as being malicious. By using AI, the example techniques may be capable of explaining reasoning that the file is classified as malicious or non-malicious more accurately, precisely, and/or reliably than conventional techniques. By providing an explanation of why a file is classified as malicious or non-malicious, the example techniques may increase a user experience of an information technology (IT) professional who is tasked with managing security of a system (e.g., a computer network) that encounters the file. For example, the explanation may indicate features that warrant further investigation and/or enable the IT professional to make more informed decisions regarding the security of the system. The user experience of the IT professional may be increased in other ways, for example, through the increased accuracy, precision, and/or reliability of the classification of the file and/or the explanation of the reasoning for the classification. The example techniques may increase an efficiency of the IT professional by reducing the amount of time that the IT professional otherwise would have consumed to determine the reasoning for the classification of the file.

The example techniques may be implemented as a stand-alone, robust, and scalable feature that does not require substantial preprocessing of data or significant modifications to the AI model.

The example techniques may reduce an amount of time and/or resources (e.g., processor cycles, memory, network bandwidth) that is consumed to classify a file with regard to maliciousness and/or to determine reasoning that the file is classified as malicious or non-malicious. For instance, by using AI to classify the file and to provide an explanation of the reasoning that the file is classified as malicious or non-malicious, the amount of time and resources that otherwise would have been consumed to perform such tasks manually (e.g., based on instructions received from a human grader) may be avoided. Accordingly, using AI enables classification of the file with regard to maliciousness and identification of the reasoning for the classification to be automated. Automating the classification and the identification of the reasoning for the classification may reduce a cost associated with performing such tasks (e.g., by avoiding the cost of having a human grader perform the tasks). By reducing the amount of time and/or resources that is consumed, the efficiency of the computing system may be increased.

Figure 1:
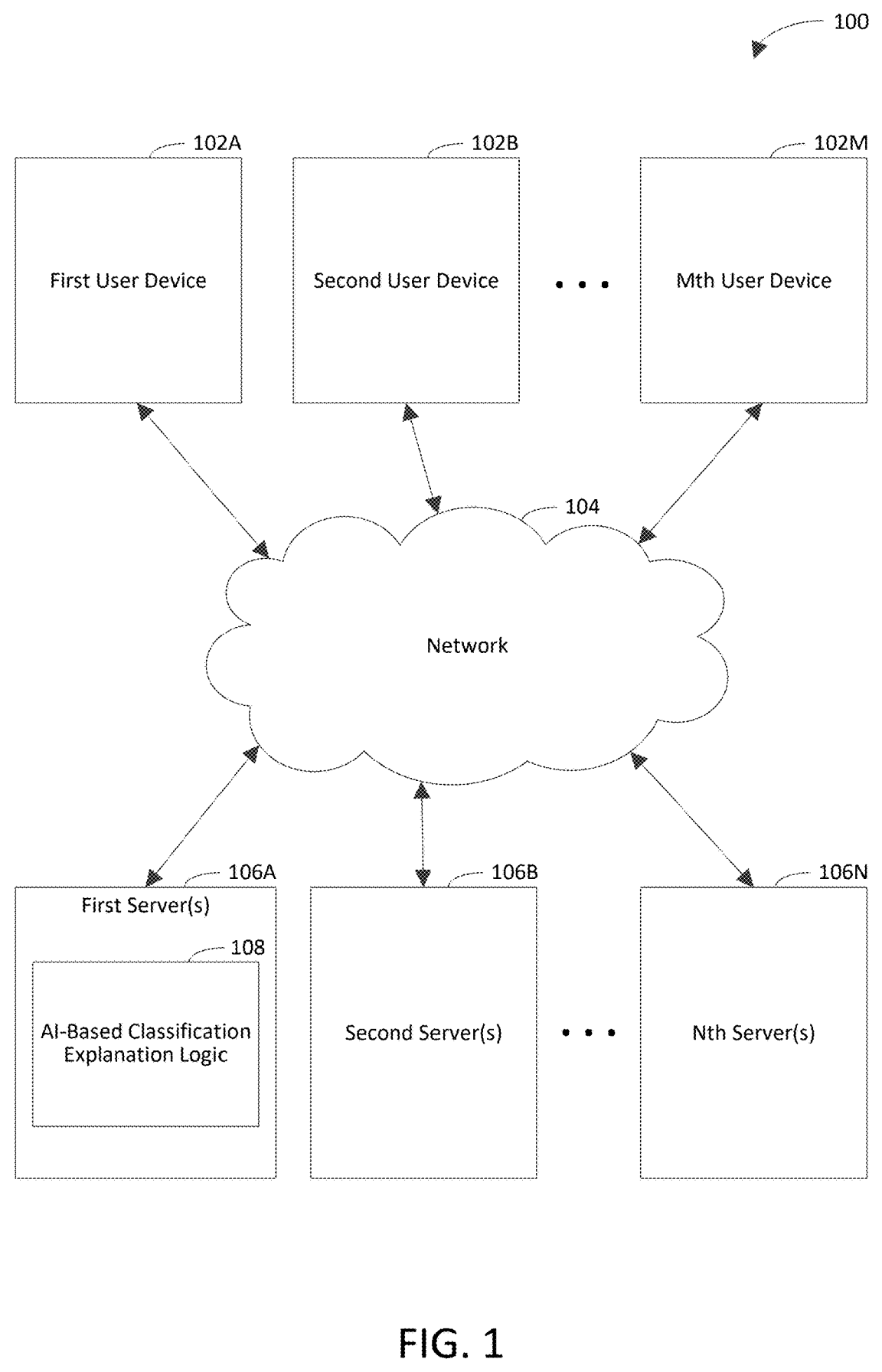

FIG. 1 is a block diagram of an example AI-based classification explanation system 100 in accordance with an embodiment. Generally speaking, the AI-based classification explanation system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the AI-based classification explanation system 100 uses an AI model to perform classification regarding maliciousness with an explanation of reasoning for the classification. Detail regarding techniques for using an AI model to perform classification regarding maliciousness with an explanation of reasoning for the classification is provided in the following discussion.

As shown in FIG. 1, the AI-based classification explanation system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes at least a portion of a processor system such that the portion of the processor system includes at least one processor that is capable of manipulating data in accordance with a set of instructions. A processor system includes one or more processors, which may be on a same (e.g., single) device or distributed among multiple (e.g., separate) devices. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the complex expression-based metadata generation system 100.

One example type of computer program that may be executed by one or more of the servers 106A-106N is an anti-malware program. An anti-malware program is a computer program that is configured to detect, block, and/or remove malware. It will be recognized that an anti-malware program or at least a portion thereof may be executed by any one or more of the user devices 102A-102M. Examples of an anti-malware program include but are not limited to a Microsoft Defender® program developed and distributed by Microsoft Corporation; a Norton AntiVirus® program developed and distributed by Symantec Corporation; a McAfee LiveSafe® program developed and distributed by McAfee, Inc.; a Crowdstrike Falcon® program developed and distributed by Crowdstrike, Inc.; a Bitdefender® program developed and distributed by Bitdefender IPR Management Ltd.; and an Avast Antivirus™ program developed and distributed by Avast Software s.r.o. It will be recognized that the example techniques described herein may be implemented using an anti-malware program. For instance, a software product (e.g., a subscription service, a non-subscription service, or a combination thereof) may include the anti-malware program, and the software product may be configured to perform the example techniques, though the scope of the example embodiments is not limited in this respect.

An anti-malware program may be incorporated into a cloud computing program (a.k.a. a cloud service). A cloud computing program is a computer program that provides hosted service(s) via a network (e.g., network 104). For instance, the hosted service(s) may be hosted by any one or more of the servers 106A-106N. The cloud computing program may enable users (e.g., at any of the user systems 102A-102M) to access shared resources that are stored on or are otherwise accessible to the server(s) via the network.

The cloud computing program may provide hosted service(s) according to any of a variety of service models, including but not limited to Backend as a Service (BaaS), Software as a Service (SaaS), Platform as a Service (PaaS), and Infrastructure as a Service (IaaS). BaaS enables applications (e.g., software programs) to use a BaaS provider's backend services (e.g., push notifications, integration with social networks, and cloud storage) running on a cloud infrastructure. SaaS enables a user to use a SaaS provider's applications running on a cloud infrastructure. PaaS enables a user to develop and run applications using a PaaS provider's application development environment (e.g., operating system, programming-language execution environment, database) on a cloud infrastructure. IaaS enables a user to use an IaaS provider's computer infrastructure (e.g., to support an enterprise). For example, IaaS may provide to the user virtualized computing resources that utilize the IaaS provider's physical computer resources.

Examples of a cloud computing program include but are not limited to a Google Cloud® program developed and distributed by Google Inc.; an Oracle Cloud® program developed and distributed by Oracle Corporation; an Amazon Web Services® program developed and distributed by Amazon.com, Inc.; a Salesforce® program developed and distributed by Salesforce.com, Inc.; an AppSource® program developed and distributed by Microsoft Corporation; an Azure® program developed and distributed by Microsoft Corporation; a GoDaddy® program developed and distributed by GoDaddy.com LLC; and a Rackspace® program developed and distributed by Rackspace US, Inc. It will be recognized that the example techniques described herein may be implemented using a cloud computing program. For instance, a software product (e.g., a subscription service, a non-subscription service, or a combination thereof) may include the cloud computing program, and the software product may be configured to perform the example techniques, though the scope of the example embodiments is not limited in this respect.

The first server(s) 106A are shown to include AI-based classification explanation logic 108 for illustrative purposes. The AI-based classification explanation logic 108 is configured to use an AI model to perform classification regarding maliciousness with an explanation of reasoning for the classification. In an example implementation, the AI-based classification explanation logic 108 causes an AI model to classify a target file in a malicious class or a non-malicious class and to provide an explanation that describes reasoning used by the AI model in choosing the malicious class or the non-malicious class in which to classify the target file by providing an AI prompt together with the target file as inputs to the AI model. The AI prompt requests that the AI model choose between the malicious class and the non-malicious class in which to classify the target file and further requests the explanation that describes the reasoning used by the AI model in choosing the malicious class or the non-malicious class in which to classify the target file. The target file includes context regarding the AI prompt. The AI-based classification explanation logic 108 receives a response to the AI prompt from the AI model. The response includes an indication of a selected class in which the AI model classifies the target file and further includes the explanation that describes the reasoning used by the AI model in choosing the selected class in which to classify the target file. The selected class is the malicious class or the non-malicious class. The AI-based classification explanation logic 108 stores the explanation, which describes the reasoning used by the AI model in choosing the selected class in which to classify the target file, and/or provides the explanation to the user via a user interface. Based at least on the indication of the selected class in which the AI model classifies the target file, the AI-based classification explanation logic 108 performs a security operation with regard to the target file.

The AI-based classification explanation logic 108 may be implemented in various ways to use an AI model to perform classification regarding maliciousness with an explanation of reasoning for the classification, including being implemented in hardware, software, firmware, or any combination thereof. For example, the AI-based classification explanation logic 108 may be implemented as computer program code configured to be executed in one or more processors. In another example, at least a portion of the AI-based classification explanation logic 108 may be implemented as hardware logic/electrical circuitry. For instance, at least a portion of the AI-based classification explanation logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the AI-based classification explanation logic 108 may be (or may be included in) an anti-malware program and/or a cloud computing program, though the scope of the example embodiments is not limited in this respect.

The AI-based classification explanation logic 108 is shown to be incorporated in the first server(s) 106A for illustrative purposes and is not intended to be limiting. It will be recognized that the AI-based classification explanation logic 108 (or any portion(s) thereof) may be incorporated in any one or more of the servers 106A-106N, any one or more of the user devices 102A-102M, or any combination thereof. For example, client-side aspects of the AI-based classification explanation logic 108 may be incorporated in one or more of the user devices 102A-102M, and server-side aspects of AI-based classification explanation logic 108 may be incorporated in one or more of the servers 106A-106N.

Figure 3:
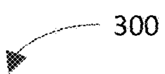
Figure 3:
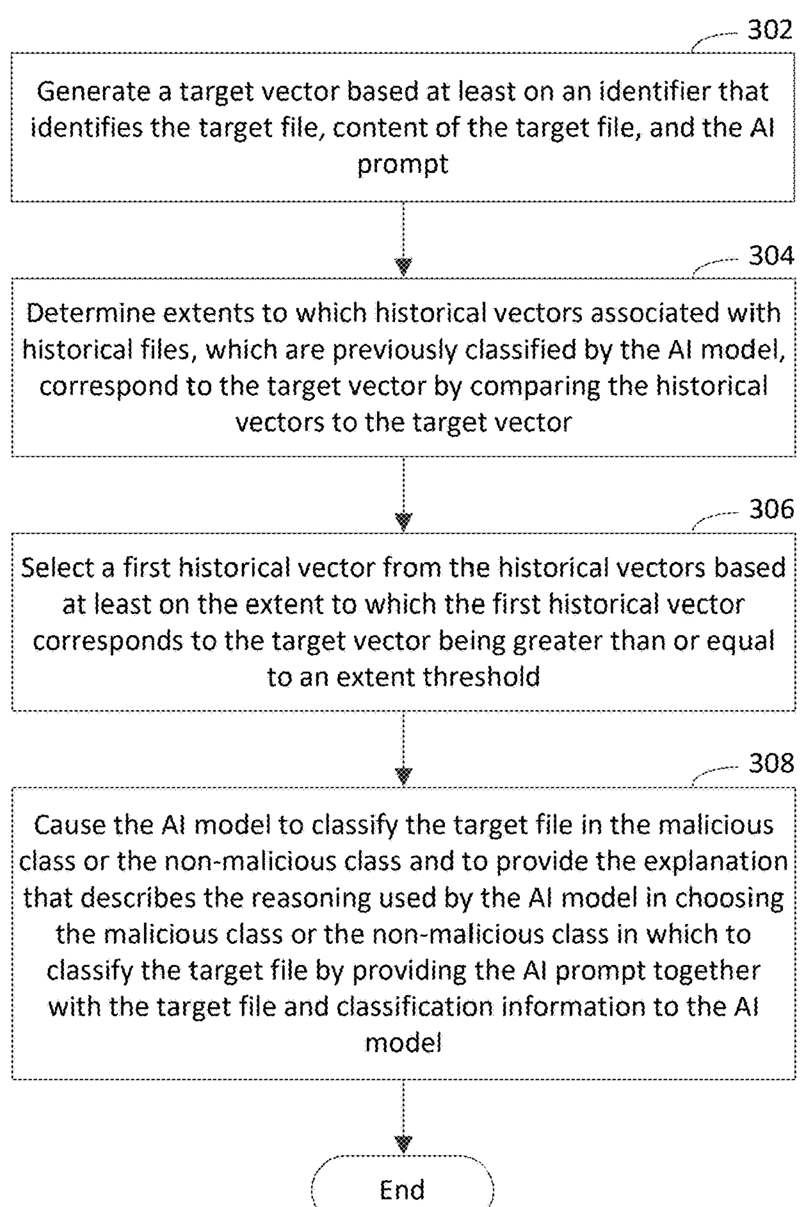
Figure 4:
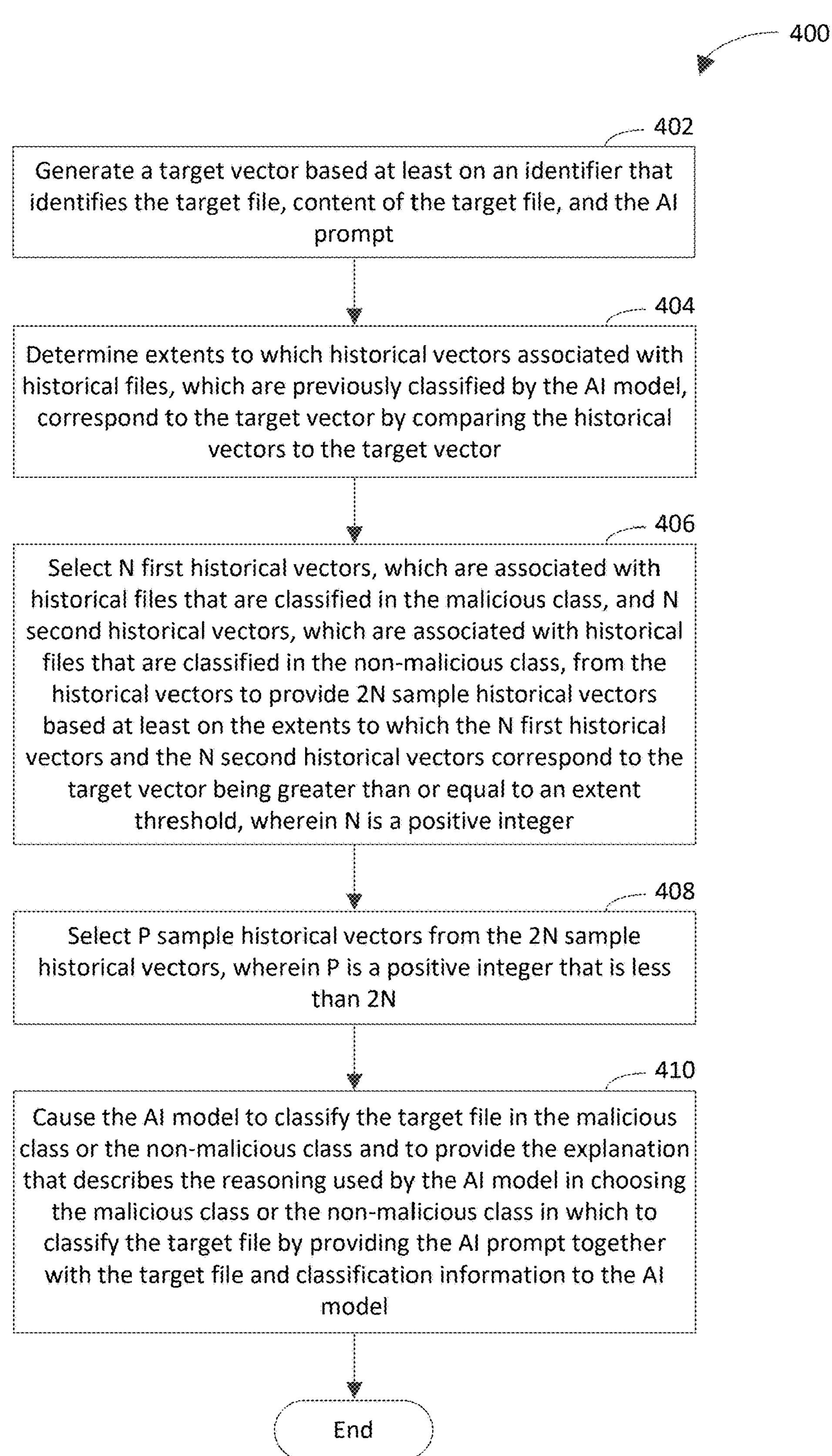
Figure 5:
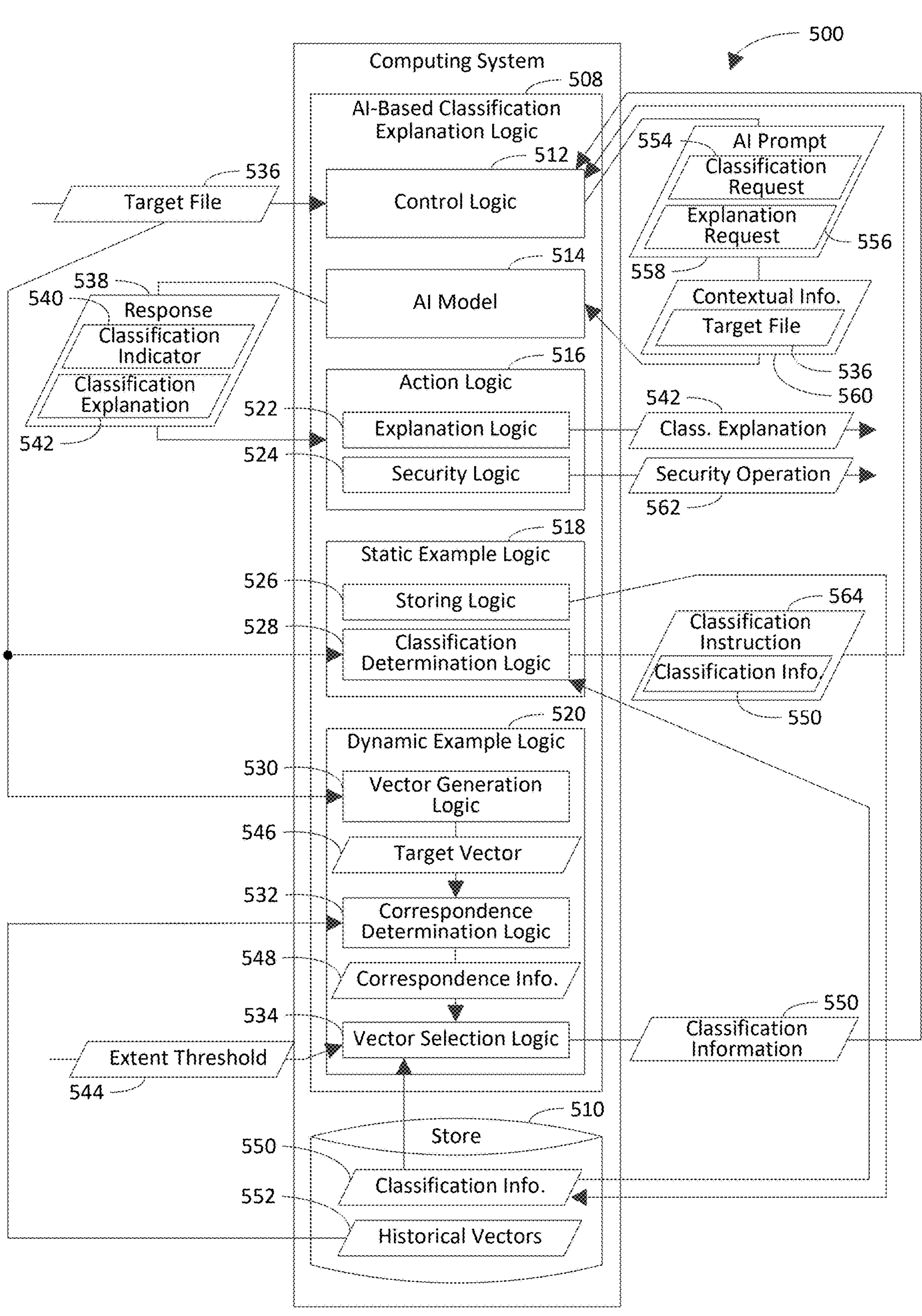
FIG. 5 is a block diagram of an example computing system in accordance with an embodiment.

FIGS. 2-4 depict flowcharts 200, 300, and 400 of example methods for performing AI-based file maliciousness classification with an explanation of reasoning in accordance with embodiments. Flowcharts 200, 300, and 400 may be performed by the first server(s) 106A shown in FIG. 1, for example. For illustrative purposes, flowcharts 200, 300, and 400 are described with respect to a computing system 500 shown in FIG. 5, which is an example implementation of the first server(s) 106A. As shown in FIG. 5, the computing system 500 includes AI-based classification explanation logic 508 and a store 510. The AI-based classification explanation logic 708 includes control logic 512, an AI model 514, action logic 516, static example logic 518, and dynamic example logic 520. The action logic 516 includes explanation logic 522 and security logic 524. The static example logic 518 includes storing logic 526 and classification determination logic 528. The dynamic example logic 520 includes generation logic 530, correspondence determination logic 532, and vector selection logic 534. The store 510 may be any suitable type of store. One type of store is a database. For instance, the store 510 may be a relational database, an entity-relationship database, an object database, an object relational database, an extensible markup language (XML) database, etc. The store 510 is shown to store classification information 550 and historical vectors 552 for non-limiting, illustrative purposes. Further structural and operational embodiments will be apparent to persons skilled in the relevant art(s) based on the discussion regarding flowcharts 200, 300, and 400.

As shown in FIG. 2, the method of flowchart 200 begins at step 202. In step 202, an AI model is caused (e.g., triggered) to classify a target file in a malicious class or a non-malicious class and to provide an explanation that describes reasoning used by the AI model in choosing the malicious class or the non-malicious class in which to classify the target file by providing an AI prompt together with the target file as inputs to the AI model. The AI prompt requests that the AI model choose between the malicious class and the non-malicious class in which to classify the target file and further requests the explanation that describes the reasoning used by the AI model in choosing the malicious class or the non-malicious class in which to classify the target file. The target file includes context regarding the AI prompt.

In an example embodiment, the AI prompt is a natural language prompt. A natural language prompt is a prompt that is written in a natural language. A natural language is a human language that has developed through use and repetition. For instance, the natural language may have developed naturally without conscious planning or premeditation. Examples of a natural language include English, French, Spanish, and Mandarin. In an aspect, the natural language prompt is generated by a user (e.g., a human). In another aspect, the natural language prompt is generated by a computing system (e.g., an anti-malware program that runs on the computing system).

In an example implementation, the control logic 512 causes the AI model 514 to classify a target file 536 in a malicious class or a non-malicious class and to provide a classification explanation 542 that describes reasoning used by the AI model 514 in choosing the malicious class or the non-malicious class in which to classify the target file 536 by providing an AI prompt 558 together with contextual information 560, which includes the target file 536, as inputs to the AI model 514. The AI prompt 558 includes a classification request 554 and an explanation request 556. The classification request 554 requests that the AI model 514 choose between the malicious class and the non-malicious class in which to classify the target file 536. The explanation request 556 requests that the AI model 514 provide the classification explanation 542, which describes the reasoning used by the AI model 514 in choosing the malicious class or the non-malicious class in which to classify the target file 536. The target file 536 includes context regarding the AI prompt 558.

In an example embodiment, the control logic 512 performs one or more pre-processing operations on contextual information 560 (e.g., the target file 536) prior to providing the contextual information 560 to the AI model 514. Examples of a pre-processing operation include but are not limited to removing comma(s), slash(es), and/or white space(s) (e.g., tab(s) and/or redundant blank space(s)) from the contextual information 560.

In another example embodiment, the contextual information 560 includes information in addition to the target file 536. For instance, the information may indicate (e.g., specify) a name of the target file 536, a location from which the target file 536 is downloaded, a process path associated with the target file 536, a process command line associated with the target file 536, a parent process command line associated with the target file 536, a real time process name associated with the target file 536, a signor who signs the target file 536, a publisher who publishes the target file 536, a certificate associated with the target file 536, header byte(s) and/or footer byte(s) associated with the target file 536, behavior (e.g., registry behavior or event tracing for Windows® (ETW) behavior) associated with the target file 536, and/or a type of the target file 536. In an example, the information includes a uniform resource identifier (URI) that indicates the location from which the target file 536 is downloaded. In an aspect, the URI is a uniform resource locator (URL) or a uniform resource name (URN). In another example, the process path includes the name of the target file 536 and a hierarchical list of folders that include the target file 536. In yet another example, the process command line includes the process path and arguments that precede the process path in a command line that is used to initiate execution of the target file 536. In still another example, the parent process command line indicates (e.g., includes or is) a command that is used to initiate a parent process associated with the target file 536. In another example, the real time process name indicates (e.g., includes or is) a name of a process that is associated with the target file 536 and that currently runs in real-time. In yet another example, the type of the file may be an executable file, a text file, an image file (e.g., a picture file or a video file), a portable document format (PDF) file, or a file that is associated with a particular computer program (e.g., a Word™ file associated with a Word™ program developed and distributed by Microsoft Corporation or an Excel® file associated with an Excel® program developed and distributed by Microsoft Corporation).

In yet another example embodiment, the control logic 512 causes the AI model 514 to analyze (e.g., develop and/or refine an understanding of) the AI prompt 558 (including the classification request 554 and the explanation request 556), the contextual information 560 (including the target file 536), relationships between any of the foregoing, and confidences in those relationships. For example, the control logic 512 may cause the AI model 514 to compare attributes of the AI prompt 558 and the contextual information 560 (which may include sample AI prompt(s) and sample contextual information) using artificial intelligence to determine whether the target file 536 is to be classified in the malicious class or the non-malicious class and to generate the explanation that describes the reasoning used by the AI model 514 in choosing the malicious class or the non-malicious class in which to classify the target file 536.

In some example embodiments, the AI model 514 includes a neural network that uses the artificial intelligence to determine (e.g., predict) relationships between the AI prompt 558 and the contextual information 560 and confidences in the relationships. The neural network uses those relationships to determine whether the target file 536 is to be classified in the malicious class or the non-malicious class and to generate the explanation that describes the reasoning used by the AI model 514 in choosing the malicious class or the non-malicious class in which to classify the target file 536. For example, attributes of the AI prompt 558 and the contextual information 560 (and potentially example AI prompt(s) and example contextual information) may be compared to determine similarities and differences between those attributes. In accordance with this example, the neural network may use those similarities and differences to determine the selected class (i.e., the malicious class or the non-malicious class) in which to classify the target file 536 and to generate the explanation of the reasoning in choosing the selected class in which to classify the target file 536.

Examples of a neural network include but are not limited to a feed forward neural network and a transformer-based neural network. A feed forward neural network is an artificial neural network for which connections between units in the neural network do not form a cycle. The feed forward neural network allows data to flow forward (e.g., from the input nodes toward to the output nodes), but the feed forward neural network does not allow data to flow backward (e.g., from the output nodes toward to the input nodes). In an example embodiment, the control logic 512 employs a feed forward neural network to train the AI model 514, which is used to determine AI-based confidences. Such AI-based confidences may be used to determine likelihoods that events will occur.

A transformer-based neural network is a neural network that incorporates a transformer. A transformer is a deep learning model that utilizes attention to differentially weight the significance of each portion of sequential input data, such as natural language. Attention is a technique that mimics cognitive attention. Cognitive attention is a behavioral and cognitive process of selectively concentrating on a discrete aspect of information while ignoring other perceivable aspects of the information. Accordingly, the transformer uses the attention to enhance some portions of the input data while diminishing other portions. The transformer determines which portions of the input data to enhance and which portions of the input data to diminish based on the context of each portion. For instance, the transformer may be trained to identify the context of each portion using any suitable technique, such as gradient descent.

In an example embodiment, the transformer-based neural network generates a maliciousness classification model (e.g., to classify files regarding maliciousness) by utilizing information, such as AI prompts (e.g., the AI prompt 558), contextual information (e.g., the contextual information 560), relationships between any of the foregoing, and AI-based confidences that are derived therefrom.

In example embodiments, the AI prompt 558 includes training logic, and the AI model 514 includes inference logic. The training logic is configured to train an AI algorithm that the inference logic uses to determine (e.g., infer) the AI-based confidences. For instance, the training logic may provide sample AI prompts and sample contextual information as inputs to the AI algorithm to train the AI algorithm. The sample data may be labeled. The AI algorithm may be configured to derive relationships between the features (e.g., the AI prompt 558 and the contextual information 560) and the resulting AI-based confidences. The inference logic is configured to utilize the AI algorithm, which is trained by the training logic, to determine the AI-based confidence when the features are provided as inputs to the algorithm.

In an example embodiment, the AI model 514 is a large language model (LLM). A large language model is an artificial neural network that is capable of performing natural language processing (NLP) tasks. For instance, the large language model may use a transformer model to perform the NLP tasks. In an aspect, the large language model is trained (e.g., pre-trained) using self-supervised learning and semi-supervised learning. Examples of a large language model include but are not limited to the GPT-3 and GPT-4 models, developed and distributed by OpenAI, Inc.; the LLAMA model, developed and distributed by Meta Platforms Inc.; and the PALM model, developed and distributed by Google LLC.

At step 204, a response to the AI prompt is received from the AI model. The response includes an indication of a selected class in which the AI model classifies the target file and further includes the explanation that describes the reasoning used by the AI model in choosing the selected class in which to classify the target file. The selected class is the malicious class or the non-malicious class. In an example embodiment, the explanation is written in a natural language. In accordance with this embodiment, the explanation is a human-readable explanation. In another example embodiment, the explanation indicates multiple attributes of the target file that contributed to the AI model choosing the selected class in which to classify the target file. In an example implementation, the action logic 516 receives a response 538 to the AI prompt 558 from the AI model 514. The response 538 includes a classification indicator 540 and the classification explanation 542. The classification indicator 540 indicates the selected class in which the AI model 514 classifies the target file 536. The classification explanation 542 describes the reasoning used by the AI model 514 in choosing the selected class in which to classify the target file 536.

Each of the malicious class and the non-malicious class may include any suitable number (e.g., 0, 1, 2, 3, 4, or 5) of sub-classes. In an example embodiment, the malicious class includes an "active attack" sub-class and a "passive attack" sub-class. In accordance with this embodiment, the AI model may classify the target file in the "active attack" sub-class based on (e.g., based at least on) the target file being associated with an active attack. An active attack is a cyberattack in which the target file is used in an attempt to alter a system resource and/or to affect operation of the system resource. A cyberattack is an attempt to obtain unauthorized or illegal access to a system resource. A system resource is a physical or virtual component having a limited availability in a system. For instance, the system may be a computing system or a networked system that includes the computing system. A networked system is a system that connects computing systems via a network. In further accordance with this embodiment, the AI model may classify the target file in the "passive attack" sub-class based on the target file being associated with a passive attack. A passive attack is a cyberattack in which the target file is used in an attempt to obtain or use information from a system without attempting to alter system resources in the system and without attempting to affect operation of the system resources.

In another example embodiment, the non-malicious class includes a "spam" sub-class and a "clean" sub-class. In accordance with this embodiment, the AI model may classify the target file in the "spam" sub-class based on (e.g., based at least on) the AI model determining that the target file is associated with (e.g., attached to) a spam message. A spam message is an unsolicited or undesired electronic message. For instance, the electronic message may be an email message, an instant message (IM), or a short messaging service (SMS) message. In further accordance with this embodiment, the AI model may classify the target file in the "clean" sub-class based on the AI model determining that the target file is not associated with a spam message.

At step 206, the explanation, which describes the reasoning used by the AI model in choosing the selected class in which to classify the target file, is provided to the user via a user interface. In an example implementation, the explanation logic 522 provides the classification explanation 542, which describes the reasoning used by the AI model 514 in choosing the selected class in which to classify the target file 536, to the user via the user interface. It will be recognized that the explanation need not necessarily be provided to the user. For instance, the explanation may be stored (e.g., in the store 510) without providing the explanation to the user.

At step 208, based at least on the indication of the selected class in which the AI model classifies the target file, a security operation is performed with regard to the target file. In a first example embodiment, performing the security operation at step 208 includes discontinuing access of a user to the target file based at least on the selected class being the malicious class. In a second example embodiment, performing the security operation at step 208 includes quarantining the target file in a sandbox based at least on the selected class being the malicious class. A sandbox is a region in a store (e.g., store 510) that is isolated from other regions in the store. In an aspect, the sandbox is a virtual container in which untrusted (e.g., malicious or potentially malicious) software programs can be safely executed. In accordance with this aspect, the sandbox is configured to detect when an untrusted software program performs a malicious operation in the virtual container. For instance, a software program can run in the sandbox without negatively impacting software programs that run outside the sandbox and/or without negatively impacting data that is stored outside the sandbox. In a third example embodiment, performing the security operation at step 208 includes sending an alert, which indicates that the target file is classified as malicious, to an IT professional based at least on the selected class being the malicious class. In a fourth example embodiment, performing the security operation at step 208 includes enabling a user to access the target file based at least on the selected class being the non-malicious class. In an example implementation, based at least on the classification indicator 540 indicating the selected class in which the AI model 514 classifies the target file 536, the security logic 524 performs a security operation 562 with regard to the target file 536.

In an example embodiment, causing the AI model to classify the target file and to provide the explanation at step 202 includes causing the AI model to classify the target file, to provide the explanation, and to provide an indication of a confidence associated with a classification of the target file in the malicious class or the non-malicious class. In accordance with this embodiment, the AI prompt further requests the indication of the confidence associated with the classification of the target file in the malicious class or the non-malicious class. In further accordance with this embodiment, the response further includes the indication of the confidence associated with the classification of the target file in the selected class. For instance, the control logic 512 may generate the contextual information 560 to include the indication of the confidence in addition to the target file 536. In an aspect of this embodiment, the method of flowchart 200 further includes providing the indication of the confidence, which is associated with the classification of the target file in the selected class, to the user via the user interface. For example, the explanation logic 522 may provide the indication of the confidence (e.g., in addition to the classification explanation 542) to the user via the user interface. In another aspect of this embodiment, performing the security operation at step 208 is further based at least on the confidence associated with the classification of the target file in the selected class. For instance, the security logic 524 may be configured to perform a first security action based at least on the confidence being greater than or equal to a confidence threshold, and the security logic 524 may be configured to perform a second security action, which is different from the first security action, based at least on the confidence being less than the confidence threshold. The confidence threshold may be any suitable value (e.g., 0.7, 0.8, or 0.85).

In some example embodiments, one or more steps 202, 204, 206, and/or 208 of flowchart 200 may not be performed. Moreover, steps in addition to or in lieu of steps 202, 204, 206, and/or 208 may be performed. For instance, in an example embodiment, the method of flowchart 200 further includes storing classification information in a store. The classification information includes a reference identifier that identifies a reference file, reference content of the reference file, a reference AI prompt, and a reference response to the reference AI prompt. The reference AI prompt requests that the AI model choose between the malicious class and the non-malicious class in which to classify the reference file and further requests a reference explanation that describes reference reasoning used by the AI model in choosing the malicious class or the non-malicious class in which to classify the reference file. The reference response includes an indication of a reference class in which the reference file is classified and further includes the reference explanation that describes the reference reasoning for classifying the reference file in the reference class. The reference class is the malicious class or the non-malicious class. In an aspect, the reference file is a pre-determined reference file, which is determined prior to determining that the target file is to be classified in the malicious class or the non-malicious class. In another aspect, the reference file is a static reference file. In yet another aspect, the reference identifier is an encoded version of the reference file. For instance, the reference identifier may be generated by encoding the reference file using a secure hash algorithm (SHA). Examples of a secure hash algorithm include but are not limited to SHA-224, SHA-256, SHA-384, and SHA-512. In an example implementation, the storing logic 526 stores classification information 550 in the store 510. The classification information 550 includes the reference identifier that identifies the reference file, the reference content of the reference file, the reference AI prompt, and the reference response to the reference AI prompt.

In accordance with this embodiment, the method of flowchart 200 further includes, in response to storing the classification information in the store, determining that the target file is to be classified among a plurality of classes that comprises the malicious class and the non-malicious class. In an example implementation, in response to the storing logic 526 storing the classification information 550 in the store 510, the classification determination logic 528 determines that the target file 536 is to be classified among the plurality of classes that comprises the malicious class and the non-malicious class. The determination may be made based at least on receipt of a human-generated request from a user or a system-generated request (e.g., from an anti-malware program or a computing system on which the anti-malware program runs). In accordance with this implementation, the classification determination logic 528 generates a classification instruction 564 that instructs the control logic 512 to cause the AI model 514 to classify the target file 536 among the plurality of classes. The classification instruction 564 may further instruct the control logic 512 to cause the AI model 514 to provide the classification explanation 542. The classification instruction 564 includes the classification information 550.

In further accordance with this embodiment, the AI model is caused to classify the target file in the malicious class or the non-malicious class and to provide the explanation that describes the reasoning used by the AI model in choosing the malicious class or the non-malicious class in which to classify the target file by providing the AI prompt together with the target file and the classification information to the AI model. In an example implementation, the control logic 512 causes the AI model 514 to classify the target file 536 and to provide the classification explanation 542 by providing the AI prompt 558 together with the contextual information 536, which includes the target file 536 and the classification information 550, to the AI model 514. For example, the control logic 512 may cause the AI model 514 to classify the target file 536 among the plurality of classes (e.g., and generate the classification explanation 542) based at least on receipt of the classification instruction 564. In an aspect of this example, the classification instruction 564 instructing the control logic 512 to cause the AI model 514 to classify the target file 536 among the plurality of classes triggers the control logic 514 to cause the AI model 514 to classify the target file 536 among the plurality of classes. In another aspect of this example, the classification instruction 564 instructing the control logic 512 to provide the classification explanation 542 triggers the control logic 514 to cause the AI model 514 to provide the classification explanation 542. In yet another aspect, the control logic 512 causes the AI model 514 to analyze the reference identifier that identifies the reference file, the reference content of the reference file, the reference AI prompt, and the reference response, all of which are included in the classification information 550, to determine in which of the malicious class or the non-malicious class the target file 536 is to be classified. In an example of this aspect, control logic 512 causes the AI model 514 to further analyze an identifier that identifies the target file 536, content of the target file 536, and the AI prompt 558 to make the determination. In accordance with this example, the AI model 514 determines similarities and differences between the reference identifier that identifies the reference file, the reference content of the reference file, the reference AI prompt, the reference response, the identifier that identifies the target file 536, the content of the target file 536, and the AI prompt 558. In further accordance with this example, the AI model 514 determines in which of the malicious class or the non-malicious class the target file 536 is to be classified based at least on the similarities and the differences.

In an aspect of this embodiment, the classification information further includes a confidence indicator that indicates a confidence associated with a classification of the reference file in the malicious class or the non-malicious class. In an example, the classification information is provided to the AI model based at least on the confidence being greater than or equal to a confidence threshold.

In another aspect of this embodiment, the classification information further includes a second reference identifier that identifies a second reference file, second reference content of the second reference file, a second reference AI prompt, and a second reference response to the second reference AI prompt. The second reference AI prompt requests that the AI model choose between the malicious class and the non-malicious class in which to classify the second reference file and further requests a second reference explanation that describes second reference reasoning used by the AI model in choosing the malicious class or the non-malicious class in which to classify the second reference file. In accordance with this aspect, the second reference response includes an indication of a second reference class in which the second reference file is classified and further includes the second reference explanation that describes the second reference reasoning for classifying the second reference file in the second reference class. The second reference class is the malicious class or the non-malicious class. In an example of this aspect, the classification information further includes a second confidence indicator that indicates a second confidence associated with a classification of the second reference file in the malicious class or the non-malicious class.

It will be recognized that the classification information may include a third reference identifier that identifies a third reference file, third reference content of the third reference file, a third reference AI prompt, and a third reference response to the third reference AI prompt; a fourth reference identifier that identifies a fourth reference file, fourth reference content of the fourth reference file, a fourth reference AI prompt, and a fourth reference response to the fourth reference AI prompt, and so on. Each of the reference files may be a pre-determined reference file, a static reference file, or other type of reference file. In an example, the classification information further includes a third confidence indicator that indicates a third confidence associated with a classification of the third reference file, a fourth confidence indicator that indicates a fourth confidence associated with a classification of the fourth reference file, and so on.

In another example embodiment, the method of flowchart 200 further includes one or more of the steps shown in flowchart 300 of FIG. 3. As shown in FIG. 3, the method of flowchart 300 begins at step 302. In step 302, a target vector is generated based at least on an identifier that identifies the target file, content of the target file, and the AI prompt. In an example embodiment, the target vector is generated at step 302 to include first numerical value(s), which are numerical representation(s) of respective attribute(s) of the identifier that identifies the target file, second numerical value(s), which are numerical representation(s) of respective attribute(s) of the content of the target file, and third numerical value(s), which are numerical representation(s) of respective attribute(s) of the AI prompt. In an example implementation, the vector generation logic 530 generates a target vector 546 based at least on an identifier that identifies the target file 536, content of the target file 536, and the AI prompt 558.

At step 304, extents to which historical vectors associated with historical files, which are previously classified by the AI model, correspond to the target vector are determined by comparing the historical vectors to the target vector. In an aspect, at least some (e.g., 1, 2, . . . , all) of the historical files were classified by the AI model within a designated number of days (e.g., 1, 2, or 3) that precede a current date. By taking into consideration the historical files classified within the designated number of days that precede the current date, accuracy, precision, and/or reliability of a classification of the target file in the malicious class or the non-malicious class may be increased without a need to retrain the AI model over a period that includes the designated number of days that precede the current date. For instance, taking into consideration such historical files may provide a scalable way to integrate new information for consideration by the AI model (e.g., in real-time) as the information is received. The historical vectors are based at least on identifiers that identify the historical files, contents of the historical files, and AI prompts requesting that the AI model choose between the malicious class and the non-malicious class in which to classify the historical files and further requesting explanations that describe reasonings used by the AI model in choosing the malicious class or the non-malicious class in which to classify the historical files. In an example embodiment, each of the historical vectors includes numerical representation(s) of respective attribute(s) of the identifier that identifies the respective historical file, numerical representation(s) of respective attribute(s) of the content of the respective historical file, and numerical representation(s) of respective attribute(s) of the respective AI prompt. In an example implementation, the correspondence determination logic 532 determines extents to which the historical vectors 552 associated with the historical files, which are previously classified by the AI model 514, correspond to the target vector 536 by comparing the historical vectors 552 to the target vector 536. In accordance with this implementation, the correspondence determination logic 532 generates correspondence information 548, which indicates the extents to which the historical vectors 552 correspond to the target vector 536.

The extents to which the historical vectors correspond to the target vector are determined at step 304 using any suitable correspondence determination technique(s). Examples of a correspondence determination technique include but are not limited to a cosine similarity technique, a Euclidean distance technique, and a dot product similarity technique. In a vector ranking example, the historical vectors are ranked to provide ranks for the respective historical vectors using any one or more correspondence determination techniques. A rank of each historical vector corresponds to the extent to which the historical vector corresponds to the target vector.

At step 306, a first historical vector is selected from the historical vectors based at least on the extent to which the first historical vector corresponds to the target vector being greater than or equal to an extent threshold. For example, the first historical vector may be selected from the historical vectors at step 306 based at least on the extent to which the first historical vector corresponds to the target vector being greater than the extents to which the other historical vectors correspond to the target vector. In the vector ranking example mentioned above with regard to step 304, the first historical vector may be selected from the historical vectors at step 306 based at least on the rank of the first historical vector being greater than the ranks of the other historical vectors. In an example implementation, the vector selection logic 534 selects the first historical vector from the historical vectors 552 based at least on the extent to which the first historical vector corresponds to the target vector 536, as indicated by the correspondence information 548, is greater than or equal to an extent threshold 544.

At step 308, the AI model is caused to classify the target file in the malicious class or the non-malicious class and to provide the explanation that describes the reasoning used by the AI model in choosing the malicious class or the non-malicious class in which to classify the target file by providing the AI prompt together with the target file and classification information to the AI model. The classification information includes a first identifier that identifies a first historical file of the historical files that is associated with the first historical vector, first content of the first historical file, a first AI prompt requesting that the AI model choose between the malicious class and the non-malicious class in which to classify the first historical file and further requesting a first explanation that describes a first reasoning used by the AI model in choosing the malicious class or the non-malicious class in which to classify the first historical file, and a first response to the first AI prompt from the AI model. The first response includes an indication of a first class in which the AI model classifies the first historical file and further includes the first explanation that describes the first reasoning used by the AI model in choosing the first class in which to classify the first historical file. The first class is the malicious class or the non-malicious class. Step 308 may be included in step 202 shown in FIG. 2.

In an example implementation, the control logic 512 causes the AI model 514 to classify the target file 536 in the malicious class or the non-malicious class and to provide the classification explanation 542 by providing the AI prompt 558 together with the target file 536 and classification information 550 to the AI model 514. In accordance with this implementation, the vector selection logic 534 generates the classification information 550 to include the first identifier that identifies the first historical file, the first content of the first historical file, the first AI prompt, and the first response to the first AI prompt from the AI model 514. In further accordance with this implementation, the first response includes the indication of the first class in which the AI model 514 classifies the first historical file and further includes the first explanation that describes the first reasoning used by the AI model 514 in choosing the first class in which to classify the first historical file.

In an aspect of this embodiment, the historical vectors are further based at least on confidences associated with classifications of the historical files in the malicious class or the non-malicious class. In an example of this aspect, each of the historical vectors includes numerical representation(s) of respective attribute(s) of the identifier that identifies the respective historical file, numerical representation(s) of respective attribute(s) of the content of the respective historical file, numerical representation(s) of respective attribute(s) of the respective AI prompt, and a numerical representation of the confidence associated with the classification of the respective historical file. The numerical representation of each confidence may be equal to the confidence or may be a number associated with a numerical range that includes the confidence. For instance, a first numerical range X1 may be defined by a first inequality $0 \leq X1 \leq 10$; a second numerical range X2 may be defined by a second inequality $10 \leq X2 \leq 20$; a third numerical range may be defined by a third inequality $20 \leq X3 \leq 30$, and so on. If a confidence is included in the first numerical range, the numerical representation of the confidence may be set to "10;" if the confidence is included in the second numerical range, the numerical representation of the confidence may be set to "20," and so on. In another example of this aspect, the first historical vector is selected from the historical vectors based at least on the extent to which the first historical vector corresponds to the target vector being greater than or equal to the extent threshold and further based at least on a first confidence of the confidences that is associated with a first classification of the first historical file in the malicious class or the non-malicious class being greater than or equal to a confidence threshold. In another example of this aspect, the classification information further includes a first confidence indicator that indicates the first confidence that is associated with the first classification of the first historical file.

In another aspect of this embodiment, the method of flowchart 300 further includes selecting a second historical vector from the historical vectors based at least on the extent to which the second historical vector corresponds to the target vector being greater than or equal to the extent threshold. For example, selecting the second historical vector from the historical vectors may be based at least on the extent to which the second historical vector corresponds to the target vector being greater than the extents to which the other historical vectors, except for the first historical vector, correspond to the target vector. In an example implementation, the vector selection logic 534 selects the second historical vector from the historical vectors 552 based at least on the extent to which the second historical vector corresponds to the target vector, as indicated by the correspondence information 548, being greater than or equal to the extent threshold 544. In accordance with this aspect, the classification information further includes a second identifier that identifies a second historical file of the historical files that is associated with the second historical vector, second content of the second historical file, a second AI prompt, and a second response to the second AI prompt from the AI model. The second AI prompt requests that the AI model choose between the malicious class and the non-malicious class in which to classify the second historical file and further requests a second explanation that describes a second reasoning used by the AI model in choosing the malicious class or the non-malicious class in which to classify the second historical file. The second response includes an indication of a second class in which the AI model classifies the second historical file and further includes the second explanation that describes the second reasoning used by the AI model in choosing the second class in which to classify the second historical file. The second class is the malicious class or the non-malicious class.

In an example of this aspect, the first response indicates that the first historical file is classified in the malicious class, and the second response indicates that the second historical file is classified in the non-malicious class. In accordance with this example, providing the AI prompt together with the target file and the classification information to the AI model includes causing the AI model to process the first historical file prior to processing the second historical file based at least on the first response indicating that the first historical file is classified in the malicious class and further based at least on the second response indicating that the second historical file is classified in the non-malicious class.

In another example of this aspect, the first response indicates that the first historical file is classified in the non-malicious class, and the second response indicates that the second historical file is classified in the malicious class. In accordance with this example, providing the AI prompt together with the target file and the classification information to the AI model includes causing the AI model to process the first historical file prior to processing the second historical file based at least on the first response indicating that the first historical file is classified in the non-malicious class and further based at least on the second response indicating that the second historical file is classified in the malicious class.

In yet another example embodiment, the method of flowchart 200 further includes one or more of the steps shown in flowchart 400 of FIG. 4. As shown in FIG. 4, the method of flowchart 400 begins at step 402. In step 402, a target vector is generated based at least on an identifier that identifies the target file, content of the target file, and the AI prompt. In an example implementation, the vector generation logic 530 generates a target vector 546 based at least on an identifier that identifies the target file 536, content of the target file 536, and the AI prompt 558.

At step 404, extents to which historical vectors associated with historical files, which are previously classified by the AI model, correspond to the target vector are determined by comparing the historical vectors to the target vector. The historical vectors are based at least on identifiers that identify the historical files, contents of the historical files, and AI prompts requesting that the AI model choose between the malicious class and the non-malicious class in which to classify the historical files and further requesting explanations that describe the reasonings used by the AI model in choosing the malicious class or the non-malicious class in which to classify the historical files. In an example implementation, the correspondence determination logic 532 determines extents to which the historical vectors 552 associated with the historical files, which are previously classified by the AI model 514, correspond to the target vector 536 by comparing the historical vectors 552 to the target vector 536. In accordance with this implementation, the correspondence determination logic 532 generates correspondence information 548, which indicates the extents to which the historical vectors 552 correspond to the target vector 536.

At step 406, N first historical vectors, which are associated with historical files that are classified in the malicious class, and N second historical vectors, which are associated with historical files that are classified in the non-malicious class, are selected from the historical vectors to provide 2N sample historical vectors based at least on the extents to which the N first historical vectors and the N second historical vectors correspond to the target vector being greater than or equal to an extent threshold. N is a positive integer. In an example implementation, vector selection logic 534 selects the N first historical vectors and the N second historical vectors from the historical vectors 552 to provide the 2N sample historical vectors based at least on the extents to which the N first historical vectors and the N second historical vectors correspond to the target vector 536 being greater than or equal to the extent threshold.

At step 408, P sample historical vectors are selected from the 2N sample historical vectors. P is a positive integer that is less than 2N. For instance, P may be represented using the following inequality: P<2N. In an example embodiment, P=2N−1. In an example implementation, the vector selection logic 534 selects the P sample historical vectors from the 2N sample historical vectors.

It will be recognized that, in an alternative embodiment, P may be equal to 2N.

At step 410, the AI model is caused to classify the target file in the malicious class or the non-malicious class and to provide the explanation that describes the reasoning used by the AI model in choosing the malicious class or the non-malicious class in which to classify the target file by providing the AI prompt together with the target file and classification information to the AI model. The classification information includes P identifiers that identify P historical files of the historical files that are associated with the P sample historical vectors, contents of the P historical files, P AI prompts, and P responses to the P AI prompts from the AI model. The P AI prompts request that the AI model choose between the malicious class and the non-malicious class in which to classify the P historical files and further request explanations that describe reasonings used by the AI model in choosing the malicious class or the non-malicious class in which to classify the P historical files. The P responses include indications of selected classes in which the AI model classifies the P historical files and further include the explanations that describe the reasonings used by the AI model in choosing the selected classes in which to classify the P historical files. Each of the selected classes is the malicious class or the non-malicious class. Step 410 may be included in step 202 shown in FIG. 2.

In an example implementation, the control logic 512 causes the AI model 514 to classify the target file 536 in the malicious class or the non-malicious class and to provide the classification explanation 542 by providing the AI prompt 558 together with the target file 536 and classification information 550 to the AI model 514. In accordance with this implementation, the vector selection logic 534 generates the classification information 550 to include the P identifiers that identify the P historical files, the contents of the P historical files, the P AI prompts, and the P responses to the P AI prompts from the AI model 514. In further accordance with this implementation, the P responses include the indications of the selected classes and further include the explanations that describe the reasonings used by the AI model 514 in choosing the selected classes in which to classify the P historical files.

It will be recognized that the computing system 500 may not include one or more of the AI-based classification explanation logic 508, the store 510, the control logic 512, the AI model 514, the action logic 516, the static example logic 518, the dynamic example logic 520, the explanation logic 522, the security logic 524, the storing logic 526, the classification determination logic 528, the vector generation logic 530, the correspondence determination logic 532, and/or the vector selection logic 534. Furthermore, the computing system 500 may include components in addition to or in lieu of the AI-based classification explanation logic 508, the store 510, the control logic 512, the AI model 514, the action logic 516, the static example logic 518, the dynamic example logic 520, the explanation logic 522, the security logic 524, the storing logic 526, the classification determination logic 528, the vector generation logic 530, the correspondence determination logic 532, and/or the vector selection logic 534.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the AI-based classification explanation logic 108, the AI-based classification explanation logic 508, the store 510, the control logic 512, the AI model 514, the action logic 516, the static example logic 518, the dynamic example logic 520, the explanation logic 522, the security logic 524, the storing logic 526, the classification determination logic 528, the vector generation logic 530, the correspondence determination logic 532, the vector selection logic 534, flowchart 200, flowchart 300, and/or flowchart 400 may be implemented in hardware, software, firmware, or any combination thereof.

For example, any one or more of the AI-based classification explanation logic 108, the AI-based classification explanation logic 508, the store 510, the control logic 512, the AI model 514, the action logic 516, the static example logic 518, the dynamic example logic 520, the explanation logic 522, the security logic 524, the storing logic 526, the classification determination logic 528, the vector generation logic 530, the correspondence determination logic 532, the vector selection logic 534, flowchart 200, flowchart 300, and/or flowchart 400 may be implemented, at least in part, as computer program code configured to be executed in one or more processors.

In another example, any one or more of the AI-based classification explanation logic 108, the AI-based classification explanation logic 508, the store 510, the control logic 512, the AI model 514, the action logic 516, the static example logic 518, the dynamic example logic 520, the explanation logic 522, the security logic 524, the storing logic 526, the classification determination logic 528, the vector generation logic 530, the correspondence determination logic 532, the vector selection logic 534, flowchart 200, flowchart 300, and/or flowchart 400 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 6:
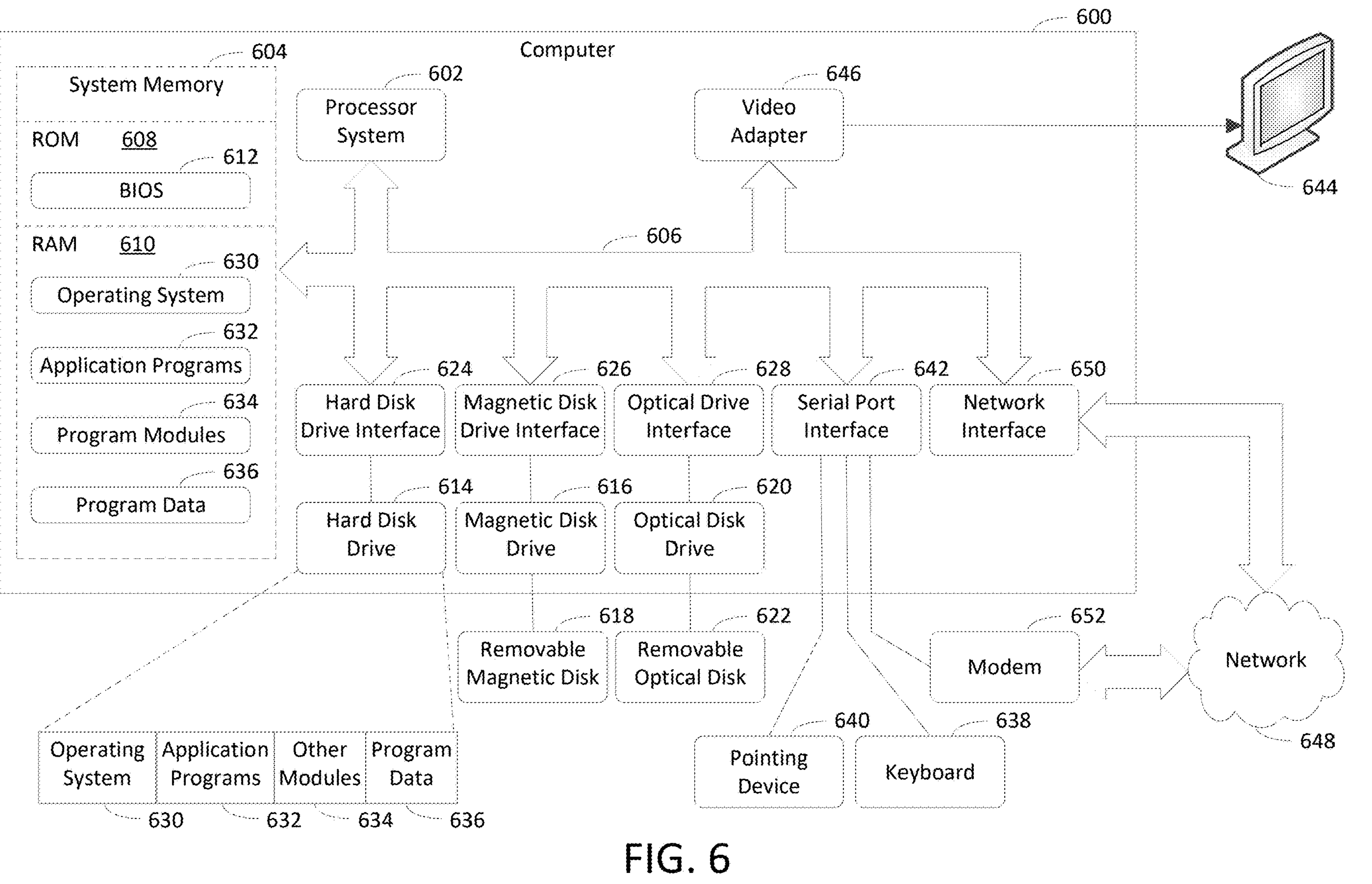
FIG. 6 depicts an example computer in which embodiments may be implemented.

II. Further Discussion of Some Example Embodiments (A1) An example system (FIG. 1, 102A-102M, 106A-106N; FIG. 5, 500; FIG. 6, 600) comprises a processor system (FIG. 6, 602) and a memory (FIG. 6, 604, 608, 610) that stores computer-executable instructions. The computer-executable instructions are executable by the processor system to at least cause (FIG. 2, 202) an AI model (FIG. 5, 514) to classify a target file (FIG. 5, 536) in a malicious class or a non-malicious class and to provide an explanation (FIG. 5, 542) that describes reasoning used by the AI model in choosing the malicious class or the non-malicious class in which to classify the target file by providing an AI prompt (FIG. 5, 558) together with the target file as inputs to the AI model. The AI prompt requests that the AI model choose between the malicious class and the non-malicious class in which to classify the target file and further requests the explanation that describes the reasoning used by the AI model in choosing the malicious class or the non-malicious class in which to classify the target file. The target file comprises context regarding the AI prompt. The computer-executable instructions are executable by the processor system further to at least receive (FIG. 2, 204) a response (FIG. 5, 538) to the AI prompt from the AI model. The response comprises an indication (FIG. 5, 540) of a selected class in which the AI model classifies the target file and further comprises the explanation that describes the reasoning used by the AI model in choosing the selected class in which to classify the target file. The selected class is the malicious class or the non-malicious class. The computer-executable instructions are executable by the processor system further to at least provide (FIG. 2, 206) the explanation, which describes the reasoning used by the AI model in choosing the selected class in which to classify the target file, to the user via a user interface. The computer-executable instructions are executable by the processor system further to at least, based at least on the indication of the selected class in which the AI model classifies the target file, perform (FIG. 2, 208) a security operation (FIG. 5, 562) with regard to the target file.

(A2) In the example system of A1, wherein the computer-executable instructions are executable by the processor system to at least: cause the AI model to classify the target file in the malicious class or the non-malicious class by providing the AI prompt together with the target file and contextual information regarding the target file as inputs to the AI model; and wherein the contextual information comprises at least one of the following: an indication of a location from which the target file is downloaded; a process path associated with the target file; a process command line associated with the target file; a parent process command line associated with the target file; or a real time process name associated with the target file.

(A3) In the example system of any of A1-A2, wherein the computer-executable instructions are executable by the processor system to at least: cause the AI model to classify the target file in the malicious class or the non-malicious class by providing the AI prompt together with the target file and contextual information regarding the target file as inputs to the AI model; and wherein the contextual information comprises at least one of the following: an indication of a signor that signs the target file; an indication of a publisher that publishes the target file; a certificate associated with the target file; at least one of a header byte associated with the target file or a footer byte associated with the target file; or an indication of behavior associated with the target file.

(A4) In the example system of any of A1-A3, wherein the explanation in the response to the AI prompt indicates a plurality of attributes of the target file that contributed to the AI model choosing the selected class in which to classify the target file.

(A5) In the example system of any of A1-A4, wherein the computer-executable instructions are executable by the processor system to at least: store classification information in a store, wherein the classification information comprises a reference identifier that identifies a reference file, reference content of the reference file, a reference AI prompt requesting that the AI model choose between the malicious class and the non-malicious class in which to classify the reference file and further requesting a reference explanation that describes reference reasoning used by the AI model in choosing the malicious class or the non-malicious class in which to classify the reference file, and a reference response to the reference AI prompt, wherein the reference response comprises an indication of a reference class in which the reference file is classified and further comprises the reference explanation that describes the reference reasoning for classifying the reference file in the reference class, wherein the reference class is the malicious class or the non-malicious class; in response to the classification information being stored in the store, determine that the target file is to be classified among a plurality of classes that comprises the malicious class and the non-malicious class; and cause the AI model to classify the target file in the malicious class or the non-malicious class and to provide the explanation that describes the reasoning used by the AI model in choosing the malicious class or the non-malicious class in which to classify the target file by providing the AI prompt together with the target file and the classification information to the AI model.

(A6) In the example system of any of A1-A5, wherein the classification information further comprises a confidence indicator that indicates a confidence associated with a classification of the reference file in the malicious class or the non-malicious class.

(A7) In the example system of any of A1-A6, wherein the classification information further comprises a second reference identifier that identifies a second reference file, second reference content of the second reference file, a second reference AI prompt requesting that the AI model choose between the malicious class and the non-malicious class in which to classify the second reference file and further requesting a second reference explanation that describes second reference reasoning used by the AI model in choosing the malicious class or the non-malicious class in which to classify the second reference file, and a second reference response to the second reference AI prompt; and wherein the second reference response comprises an indication of a second reference class in which the second reference file is classified and further comprises the second reference explanation that describes the second reference reasoning for classifying the second reference file in the second reference class, wherein the second reference class is the malicious class or the non-malicious class.

(A8) In the example system of any of A1-A7, wherein the computer-executable instructions are executable by the processor system to at least: generate a target vector based at least on an identifier that identifies the target file, content of the target file, and the AI prompt; determine extents to which historical vectors associated with historical files, which are previously classified by the AI model, correspond to the target vector by comparing the historical vectors to the target vector, wherein the historical vectors are based at least on identifiers that identify the historical files, contents of the historical files, and AI prompts requesting that the AI model choose between the malicious class and the non-malicious class in which to classify the historical files and further requesting explanations that describe reasonings used by the AI model in choosing the malicious class or the non-malicious class in which to classify the historical files; select a first historical vector from the historical vectors based at least on the extent to which the first historical vector corresponds to the target vector being greater than or equal to an extent threshold; and cause the AI model to classify the target file in the malicious class or the non-malicious class and to provide the explanation that describes the reasoning used by the AI model in choosing the malicious class or the non-malicious class in which to classify the target file by providing the AI prompt together with the target file and classification information to the AI model, wherein the classification information comprises a first identifier that identifies a first historical file of the historical files that is associated with the first historical vector, first content of the first historical file, a first AI prompt requesting that the AI model choose between the malicious class and the non-malicious class in which to classify the first historical file and further requesting a first explanation that describes a first reasoning used by the AI model in choosing the malicious class or the non-malicious class in which to classify the first historical file, and a first response to the first AI prompt from the AI model, and wherein the first response comprises an indication of a first class in which the AI model classifies the first historical file and further comprises the first explanation that describes the first reasoning used by the AI model in choosing the first class in which to classify the first historical file, wherein the first class is the malicious class or the non-malicious class.

(A9) In the example system of any of A1-A8, wherein the historical vectors are further based at least on confidences associated with classifications of the historical files in the malicious class or the non-malicious class; and wherein the computer-executable instructions are executable by the processor system to at least: select the first historical vector from the historical vectors based at least on the extent to which the first historical vector corresponds to the target vector being greater than or equal to the extent threshold and further based at least on a first confidence of the confidences that is associated with a first classification of the first historical file in the malicious class or the non-malicious class being greater than or equal to a confidence threshold.

(A10) In the example system of any of A1-A9, wherein the historical vectors are further based at least on confidences associated with classifications of the historical files in the malicious class or the non-malicious class; and wherein the classification information further comprises a first confidence indicator that indicates a first confidence of the confidences that is associated with a first classification of the first historical file in the malicious class or the non-malicious class.

(A11) In the example system of any of A1-A10, wherein the computer-executable instructions are executable by the processor system further to at least: select a second historical vector from the historical vectors based at least on the extent to which the second historical vector corresponds to the target vector being greater than or equal to the extent threshold, wherein the classification information further comprises a second identifier that identifies a second historical file of the historical files that is associated with the second historical vector, second content of the second historical file, a second AI prompt requesting that the AI model choose between the malicious class and the non-malicious class in which to classify the second historical file and further requesting a second explanation that describes a second reasoning used by the AI model in choosing the malicious class or the non-malicious class in which to classify the second historical file, and a second response to the second AI prompt from the AI model, and wherein the second response comprises an indication of a second class in which the AI model classifies the second historical file and further comprises the second explanation that describes the second reasoning used by the AI model in choosing the second class in which to classify the second historical file, wherein the second class is the malicious class or the non-malicious class.

(A12) In the example system of any of A1-A11, wherein the first response indicates that the first historical file is classified in the malicious class; wherein the second response indicates that the second historical file is classified in the non-malicious class; and wherein the computer-executable instructions are executable by the processor system to at least: based at least on the first response indicating that the first historical file is classified in the malicious class and further based at least on the second response indicating that the second historical file is classified in the non-malicious class, cause the AI model to process the first historical file prior to processing the second historical file.

(A13) In the example system of any of A1-A12, wherein the first response indicates that the first historical file is classified in the non-malicious class; wherein the second response indicates that the second historical file is classified in the malicious class; and wherein the computer-executable instructions are executable by the processor system to at least: based at least on the first response indicating that the first historical file is classified in the non-malicious class and further based at least on the second response indicating that the second historical file is classified in the malicious class, cause the AI model to process the first historical file prior to processing the second historical file.

(A14) In the example system of any of A1-A13, wherein the computer-executable instructions are executable by the processor system to at least: generate a target vector based at least on an identifier that identifies the target file, content of the target file, and the AI prompt; determine extents to which historical vectors associated with historical files, which are previously classified by the AI model, correspond to the target vector by comparing the historical vectors to the target vector, wherein the historical vectors are based at least on identifiers that identify the historical files, contents of the historical files, and AI prompts requesting that the AI model choose between the malicious class and the non-malicious class in which to classify the historical files and further requesting explanations that describe the reasonings used by the AI model in choosing the malicious class or the non-malicious class in which to classify the historical files; select N first historical vectors, which are associated with historical files that are classified in the malicious class, and N second historical vectors, which are associated with historical files that are classified in the non-malicious class, from the historical vectors to provide 2N sample historical vectors based at least on the extents to which the N first historical vectors and the N second historical vectors correspond to the target vector being greater than or equal to an extent threshold, wherein N is a positive integer; select P sample historical vectors from the 2N sample historical vectors, wherein P is a positive integer that is less than 2N; and cause the AI model to classify the target file in the malicious class or the non-malicious class and to provide the explanation that describes the reasoning used by the AI model in choosing the malicious class or the non-malicious class in which to classify the target file by providing the AI prompt together with the target file and classification information to the AI model, wherein the classification information comprises P identifiers that identify P historical files of the historical files that are associated with the P sample historical vectors, contents of the P historical files, P AI prompts requesting that the AI model choose between the malicious class and the non-malicious class in which to classify the P historical files and further requesting explanations that describe reasonings used by the AI model in choosing the malicious class or the non-malicious class in which to classify the P historical files, and P responses to the P AI prompts from the AI model, and wherein the P responses comprise indications of selected classes in which the AI model classifies the P historical files and further comprise the explanations that describe the reasonings used by the AI model in choosing the selected classes in which to classify the P historical files, wherein a selected class is the malicious class or the non-malicious class.

(A15) In the example system of any of A1-A14, wherein the computer-executable instructions are executable by the processor system to at least: cause the AI model to classify the target file, to provide the explanation, and to provide an indication of a confidence associated with a classification of the target file in the malicious class or the non-malicious class, wherein the AI prompt further requests the indication of the confidence associated with the classification of the target file in the malicious class or the non-malicious class, and wherein the response further comprises the indication of the confidence associated with the classification of the target file in the selected class; and provide the indication of the confidence, which is associated with the classification of the target file in the selected class, to the user via the user interface.

(B1) An example method is implemented by a computing system (FIG. 1, 102A-102M, 106A-106N; FIG. 5, 500; FIG. 6, 600). The method comprises causing (FIG. 2, 202) an AI model (FIG. 5, 514) to perform classification of a target file (FIG. 5, 536) with regard to maliciousness and to provide an explanation (FIG. 5, 542) that describes reasoning used by the AI model in performing the classification by providing an AI prompt (FIG. 5, 558) together with the target file as inputs to the AI model. The AI prompt requests the classification of the target file and further requests the explanation. The target file comprises context regarding the AI prompt. The method further comprises receiving (FIG. 2, 204) a response (FIG. 5, 538) to the AI prompt from the AI model. The response comprises an indication (FIG. 5, 540) of a selected class in which the AI model classifies the target file and further comprises the explanation that describes the reasoning used by the AI model in classifying the target file in the selected class. The selected class is a malicious class or a non-malicious class. The method further comprises storing the explanation, which describes the reasoning used by the AI model in classifying the target file in the selected class. The method further comprises, based at least on the indication of the selected class in which the AI model classifies the target file, performing (FIG. 2, 208) a security operation (FIG. 5, 562) with regard to the target file.

(B2) In the example method of B1, wherein causing the AI model to perform the classification of the target file with regard to maliciousness comprises: providing the AI prompt together with the target file and contextual information regarding the target file as inputs to the AI model, wherein the contextual information comprises at least one of the following: an indication of a location from which the target file is downloaded; a process path associated with the target file; a process command line associated with the target file; a parent process command line associated with the target file; or a real time process name associated with the target file.

(B3) In the example method of any of B1-B2, wherein causing the AI model to perform the classification of the target file with regard to maliciousness comprises: providing the AI prompt together with the target file and contextual information regarding the target file as inputs to the AI model, wherein the contextual information comprises at least one of the following: an indication of a signor that signs the target file; an indication of a publisher that publishes the target file; a certificate associated with the target file; at least one of a header byte associated with the target file or a footer byte associated with the target file; or an indication of behavior associated with the target file.

(B4) In the example method of any of B1-B3, wherein the explanation in the response to the AI prompt indicates a plurality of attributes of the target file that contributed to the AI model choosing the selected class in which to classify the target file.

(B5) In the example method of any of B1-B4, further comprising: storing classification information in a store, wherein the classification information comprises a reference identifier that identifies a reference file, reference content of the reference file, a reference AI prompt requesting classification of the reference file with regard to maliciousness and further requesting a reference explanation that describes reference reasoning used by the AI model in performing the classification of the reference file, and a reference response to the reference AI prompt, wherein the reference response comprises an indication of a reference class in which the reference file is classified and further comprises the reference explanation that describes the reference reasoning for classifying the reference file in the reference class, wherein the reference class is the malicious class or the non-malicious class; and in response to storing the classification information in the store, determining that the target file is to be classified among a plurality of classes that comprises the malicious class and the non-malicious class; wherein causing the AI model to perform the classification of the target file comprises: causing the AI model to perform the classification of the target file with regard to maliciousness and to provide the explanation that describes the reasoning used by the AI model in performing the classification of the target file by providing the AI prompt together with the target file and the classification information to the AI model.

(B6) In the example method of any of B1-B5, wherein the classification information further comprises a confidence indicator that indicates a confidence associated with the classification of the reference file.

(B7) In the example method of any of B1-B6, wherein the classification information further comprises a second reference identifier that identifies a second reference file, second reference content of the second reference file, a second reference AI prompt requesting classification of the second reference file with regard to maliciousness and further requesting a second reference explanation that describes second reference reasoning used by the AI model in performing the classification of the second reference file, and a second reference response to the second reference AI prompt; and wherein the second reference response comprises an indication of a second reference class in which the second reference file is classified and further comprises the second reference explanation that describes the second reference reasoning for classifying the second reference file in the second reference class, wherein the second reference class is the malicious class or the non-malicious class.

(B8) In the example method of any of B1-B7, further comprising: generating a target vector based at least on an identifier that identifies the target file, content of the target file, and the AI prompt; determining extents to which historical vectors associated with historical files, which are previously classified by the AI model, correspond to the target vector by comparing the historical vectors to the target vector, wherein the historical vectors are based at least on identifiers that identify the historical files, contents of the historical files, and AI prompts requesting classifications of the historical files with regard to maliciousness and further requesting explanations that describe reasonings used by the AI model in performing the classifications; and selecting a first historical vector from the historical vectors based at least on the extent to which the first historical vector corresponds to the target vector being greater than or equal to an extent threshold; wherein causing the AI model to perform the classification of the target file comprises: causing the AI model to perform the classification of the target file with regard to maliciousness and to provide the explanation that describes the reasoning used by the AI model in performing the classification of the target file by providing the AI prompt together with the target file and classification information to the AI model, wherein the classification information comprises a first identifier that identifies a first historical file of the historical files that is associated with the first historical vector, first content of the first historical file, a first AI prompt requesting classification of the first historical file with regard to maliciousness and further requesting a first explanation that describes a first reasoning used by the AI model in performing the classification of the first historical file, and a first response to the first AI prompt from the AI model, and wherein the first response comprises an indication of a first class in which the AI model classifies the first historical file and further comprises the first explanation that describes the first reasoning used by the AI model in performing the classification of the first historical file, wherein the first class is the malicious class or the non-malicious class.

(B9) In the example method of any of B1-B8, wherein the historical vectors are further based at least on confidences associated with the classifications of the historical files with regard to maliciousness; and wherein selecting the first historical vector from the historical vectors comprises: selecting the first historical vector from the historical vectors based at least on the extent to which the first historical vector corresponds to the target vector being greater than or equal to the extent threshold and further based at least on a first confidence of the confidences that is associated with a first classification of the first historical file with regard to maliciousness being greater than or equal to a confidence threshold.

(B10) In the example method of any of B1-B9, wherein the historical vectors are further based at least on confidences associated with the classifications of the historical files with regard to maliciousness; and wherein the classification information further comprises a first confidence indicator that indicates a first confidence of the confidences that is associated with a first classification of the first historical file with regard to maliciousness.

(B11) In the example method of any of B1-B10, further comprising: selecting a second historical vector from the historical vectors based at least on the extent to which the second historical vector corresponds to the target vector being greater than or equal to the extent threshold, wherein the classification information further comprises a second identifier that identifies a second historical file of the historical files that is associated with the second historical vector, second content of the second historical file, a second AI prompt requesting classification of the second historical file with regard to maliciousness and further requesting a second explanation that describes a second reasoning used by the AI model in performing the classification of the second historical file, and a second response to the second AI prompt from the AI model, and wherein the second response comprises an indication of a second class in which the AI model classifies the second historical file and further comprises the second explanation that describes the second reasoning used by the AI model in performing the classification of the second historical file, wherein the second class is the malicious class or the non-malicious class.

(B12) In the example method of any of B1-B11, wherein the first response indicates that the first historical file is classified in the malicious class; wherein the second response indicates that the second historical file is classified in the non-malicious class; and wherein providing the AI prompt together with the target file and the classification information to the AI model comprises: based at least on the first response indicating that the first historical file is classified in the malicious class and further based at least on the second response indicating that the second historical file is classified in the non-malicious class, causing the AI model to process the first historical file prior to processing the second historical file.

(B13) In the example method of any of B1-B12, wherein the first response indicates that the first historical file is classified in the non-malicious class; wherein the second response indicates that the second historical file is classified in the malicious class; and wherein providing the AI prompt together with the target file and the classification information to the AI model comprises: based at least on the first response indicating that the first historical file is classified in the non-malicious class and further based at least on the second response indicating that the second historical file is classified in the malicious class, causing the AI model to process the first historical file prior to processing the second historical file.

(B14) In the example method of any of B1-B13, further comprising: generating a target vector based at least on an identifier that identifies the target file, content of the target file, and the AI prompt; determining extents to which historical vectors associated with historical files, which are previously classified by the AI model, correspond to the target vector by comparing the historical vectors to the target vector, wherein the historical vectors are based at least on identifiers that identify the historical files, contents of the historical files, and AI prompts requesting classifications of the historical files with regard to maliciousness and further requesting explanations that describe reasonings used by the AI model in performing the classifications; selecting N first historical vectors, which are associated with historical files that are classified in the malicious class, and N second historical vectors, which are associated with historical files that are classified in the non-malicious class, from the historical vectors to provide 2N sample historical vectors based at least on the extents to which the N first historical vectors and the N second historical vectors correspond to the target vector being greater than or equal to an extent threshold, wherein N is a positive integer; and selecting P sample historical vectors from the 2N sample historical vectors, wherein P is a positive integer that is less than 2N; wherein causing the AI model to perform the classification of the target file comprises: causing the AI model to perform the classification of the target file with regard to maliciousness and to provide the explanation that describes the reasoning used by the AI model in performing the classification of the target file with regard to maliciousness by providing the AI prompt together with the target file and classification information to the AI model, wherein the classification information comprises P identifiers that identify P historical files of the historical files that are associated with the P sample historical vectors, contents of the P historical files, P AI prompts requesting classifications of the P historical files with regard to maliciousness and further requesting explanations that describe reasonings used by the AI model in performing the classifications of the P historical files, and P responses to the P AI prompts from the AI model, and wherein the P responses comprise indications of selected classes in which the AI model classifies the P historical files and further comprise the explanations that describe the reasonings used by the AI model in performing the classifications of the P historical files, wherein a selected class is the malicious class or the non-malicious class.

(B15) In the example method of any of B1-B14, wherein causing the AI model to perform the classification of the target file and to provide the explanation comprises: causing the AI model to perform the classification of the target file with regard to maliciousness, to provide the explanation, and to provide an indication of a confidence associated with the classification of the target file; wherein the AI prompt further requests the indication of the confidence associated with the classification of the target file; wherein the response further comprises the indication of the confidence associated with the classification of the target file in the selected class; and wherein the method further comprises: providing the indication of the confidence, which is associated with the classification of the target file in the selected class, to the user via a user interface.

(C1) An example computer program product (FIG. 6, 618, 622) comprising a computer-readable storage medium having instructions recorded thereon for enabling a processor-based system (FIG. 1, 102A-102M, 106A-106N; FIG. 5, 500; FIG. 6, 600) to perform operations. The operations comprise causing (FIG. 2, 202) an AI model (FIG. 5, 514) to classify a target file (FIG. 5, 536) in a malicious class or a non-malicious class and to provide an explanation (FIG. 5, 542) that describes reasoning used by the AI model in choosing the malicious class or the non-malicious class in which to classify the target file and to provide an indication of a confidence associated with a classification of the target file in the malicious class or the non-malicious class by providing an AI prompt (FIG. 5, 558) together with the target file as inputs to the AI model. The AI prompt requests that the AI model choose between the malicious class and the non-malicious class in which to classify the target file and further requests the explanation that describes the reasoning used by the AI model in choosing the malicious class or the non-malicious class in which to classify the target file and further requests the indication of the confidence associated with the classification of the target file in the malicious class or the non-malicious class. The target file comprises context regarding the AI prompt. The operations further comprise receiving (FIG. 2, 204) a response (FIG. 5, 538) to the AI prompt from the AI model. The response comprises an indication (FIG. 5, 540) of a selected class in which the AI model classifies the target file and further comprises the explanation that describes the reasoning used by the AI model in choosing the selected class in which to classify the target file and further comprises the indication of the confidence associated with the classification of the target file in the selected class. The selected class is the malicious class or the non-malicious class. The operations further comprise providing (FIG. 2, 206) the explanation, which describes the reasoning used by the AI model in choosing the selected class in which to classify the target file, and the indication of the confidence, which is associated with the classification of the target file in the selected class, to the user via a user interface. The operations further comprise, based at least on the indication of the selected class in which the AI model classifies the target file, performing (FIG. 2, 208) a security operation (FIG. 5, 562) with regard to the target file.

III. Example Computer System

FIG. 6 depicts an example computer 600 in which embodiments may be implemented. Any one or more of the user devices 102A-102M and/or any one or more of the servers 106A-106N shown in FIG. 1 and/or the computing system 500 shown in FIG. 5 may be implemented using computer 600, including one or more features of computer 600 and/or alternative features. Computer 600 may be a general-purpose computing device in the form of a conventional personal computer, a mobile computer, or a workstation, for example, or computer 600 may be a special purpose computing device. The description of computer 600 provided herein is provided for purposes of illustration, and is not intended to be limiting. Embodiments may be implemented in further types of computer systems, as would be known to persons skilled in the relevant art(s).

As shown in FIG. 6, computer 600 includes a processor system 602, a system memory 604, and a bus 606 that couples various system components including system memory 604 to processor system 602. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random access memory (RAM) 610. A basic input/output system 612 (BIOS) is stored in ROM 608.

Computer 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 630, one or more application programs 632, other program modules 634, and program data 636. Application programs 632 or program modules 634 may include, for example, computer program logic for implementing any one or more of (e.g., at least a portion of) the AI-based classification explanation logic 108, the AI-based classification explanation logic 508, the store 510, the control logic 512, the AI model 514, the action logic 516, the static example logic 518, the dynamic example logic 520, the explanation logic 522, the security logic 524, the storing logic 526, the classification determination logic 528, the vector generation logic 530, the correspondence determination logic 532, the vector selection logic 534, flowchart 200 (including any step of flowchart 200), flowchart 300 (including any step of flowchart 300), and/or flowchart 400 (including any step of flowchart 400), as described herein.

A user may enter commands and information into the computer 600 through input devices such as keyboard 638 and pointing device 640. Other input devices (not shown) may include a microphone, joystick, game pad, satellite dish, scanner, touch screen, camera, accelerometer, gyroscope, or the like. These and other input devices are often connected to the processor system 602 through a serial port interface 642 that is coupled to bus 606, but may be connected by other interfaces, such as a parallel port, game port, or a universal serial bus (USB).

A display device 644 (e.g., a monitor) is also connected to bus 606 via an interface, such as a video adapter 646. In addition to display device 644, computer 600 may include other peripheral output devices (not shown) such as speakers and printers.

Computer 600 is connected to a network 648 (e.g., the Internet) through a network interface or adapter 650, a modem 652, or other means for establishing communications over the network. Modem 652, which may be internal or external, is connected to bus 606 via serial port interface 642.

As used herein, the terms "computer program medium" and "computer-readable storage medium" are used to generally refer to media (e.g., non-transitory media) such as the hard disk associated with hard disk drive 614, removable magnetic disk 618, removable optical disk 622, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 632 and other program modules 634) may be stored on the hard disk, magnetic disk, optical disk, ROM, or RAM. Such computer programs may also be received via network interface 650 or serial port interface 642. Such computer programs, when executed or loaded by an application, enable computer 600 to implement features of embodiments discussed herein. Accordingly, such computer programs represent controllers of the computer 600.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:

a processor system; and a memory that stores computer-executable instructions that are executable by the processor system to at least:

generate a target vector based at least on an identifier that identifies a target file, content of the target file, and an AI prompt;

determine extents to which historical vectors associated with historical files, which are previously classified by an AI model, correspond to the target vector;

select a first historical vector from the historical vectors based at least on the extent to which the first historical vector corresponds to the target vector being greater than or equal to an extent threshold;

cause the AI model to classify the target file in a malicious class or a non-malicious class and to provide an explanation that describes reasoning used by the AI model in choosing the malicious class or the non-malicious class by providing the AI prompt together with the target file and classification information associated with the first historical vector as inputs to the AI model, the AI prompt requesting that the AI model choose between the malicious class and the non-malicious class and further requesting the explanation that describes the reasoning used by the AI model in choosing the malicious class or the non-malicious class;

receive a response to the AI prompt from the AI model, the response comprising an indication of a selected class in which the AI model classifies the target file and further comprising the explanation that describes the reasoning used by the AI model in choosing the selected class, wherein the selected class is the malicious class or the non-malicious class;

provide the explanation, which describes the reasoning used by the AI model in choosing the selected class, to a user via a user interface; and based at least on the indication of the selected class in which the AI model classifies the target file, perform a security operation with regard to the target file.

2. The system of claim 1, wherein the computer-executable instructions are executable by the processor system to at least:

cause the AI model to classify the target file in the malicious class or the non-malicious class by providing the AI prompt together with the target file and contextual information regarding the target file as inputs to the AI model; and wherein the contextual information comprises at least one of the following:

an indication of a location from which the target file is downloaded;

a process path associated with the target file;

a process command line associated with the target file;

a parent process command line associated with the target file; or a real time process name associated with the target file.

3. The system of claim 1, wherein the explanation in the response to the AI prompt indicates a plurality of attributes of the target file that contributed to the AI model choosing the selected class.

4. The system of claim 1, wherein the computer-executable instructions are executable by the processor system to at least:

store classification information in a store, wherein the classification information comprises a reference identifier that identifies a reference file, reference content of the reference file, a reference AI prompt requesting that the AI model choose between the malicious class and the non-malicious class and further requesting a reference explanation that describes reference reasoning used by the AI model in choosing the malicious class or the non-malicious class, and a reference response to the reference AI prompt, wherein the reference response comprises an indication of a reference class in which the reference file is classified and further comprises the reference explanation that describes the reference reasoning for classifying the reference file in the reference class, wherein the reference class is the malicious class or the non-malicious class;

in response to the classification information being stored in the store, determine that the target file is to be classified among a plurality of classes that comprises the malicious class and the non-malicious class; and cause the AI model to classify the target file in the malicious class or the non-malicious class and to provide the explanation that describes the reasoning used by the AI model in choosing the malicious class or the non-malicious class by providing the AI prompt together with the target file and the classification information to the AI model.

5. The system of claim 4, wherein the classification information further comprises a confidence indicator that indicates a confidence associated with a classification of the reference file in the malicious class or the non-malicious class.

6. The system of claim 4, wherein the classification information further comprises a second reference identifier that identifies a second reference file, second reference content of the second reference file, a second reference AI prompt requesting that the AI model choose between the malicious class and the non-malicious class and further requesting a second reference explanation that describes second reference reasoning used by the AI model in choosing the malicious class or the non-malicious class, and a second reference response to the second reference AI prompt; and wherein the second reference response comprises an indication of a second reference class in which the second reference file is classified and further comprises the second reference explanation that describes the second reference reasoning for classifying the second reference file in the second reference class, wherein the second reference class is the malicious class or the non-malicious class.

7. The system of claim 1, wherein the historical vectors are based at least on identifiers that identify the historical files, contents of the historical files, and AI prompts requesting that the AI model choose between the malicious class and the non-malicious class and further requesting explanations that describe reasonings used by the AI model in choosing the malicious class or the non-malicious class;

wherein the classification information comprises a first identifier that identifies a first historical file of the historical files that is associated with the first historical vector, first content of the first historical file, a first AI prompt requesting that the AI model choose between the malicious class and the non-malicious class and further requesting a first explanation that describes a first reasoning used by the AI model in choosing the malicious class or the non-malicious class, and a first response to the first AI prompt from the AI model, and wherein the first response comprises an indication of a first class in which the AI model classifies the first historical file and further comprises the first explanation that describes the first reasoning used by the AI model in choosing the first class, wherein the first class is the malicious class or the non-malicious class.

8. The system of claim 7, wherein the historical vectors are further based at least on confidences associated with classifications of the historical files in the malicious class or the non-malicious class; and wherein the classification information further comprises a first confidence indicator that indicates a first confidence of the confidences that is associated with a first classification of the first historical file in the malicious class or the non-malicious class.

9. The system of claim 7, wherein the computer-executable instructions are executable by the processor system further to at least:

select a second historical vector from the historical vectors based at least on the extent to which the second historical vector corresponds to the target vector being greater than or equal to the extent threshold, wherein the classification information further comprises a second identifier that identifies a second historical file of the historical files that is associated with the second historical vector, second content of the second historical file, a second AI prompt requesting that the AI model choose between the malicious class and the non-malicious class and further requesting a second explanation that describes a second reasoning used by the AI model in choosing the malicious class or the non-malicious class, and a second response to the second AI prompt from the AI model, and wherein the second response comprises an indication of a second class in which the AI model classifies the second historical file and further comprises the second explanation that describes the second reasoning used by the AI model in choosing the second class, wherein the second class is the malicious class or the non-malicious class.

10. The system of claim 1, wherein the historical vectors are based at least on identifiers that identify the historical files, contents of the historical files, and AI prompts requesting that the AI model choose between the malicious class and the non-malicious class and further requesting explanations that describe the reasonings used by the AI model in choosing the malicious class or the non-malicious class;

wherein the computer-executable instructions are executable by the processor system to at least:

select N first historical vectors, which are associated with historical files that are classified in the malicious class, and N second historical vectors, which are associated with historical files that are classified in the non-malicious class, from the historical vectors to provide 2N sample historical vectors based at least on the extents to which the N first historical vectors and the N second historical vectors correspond to the target vector being greater than or equal to an extent threshold, wherein N is a positive integer; and select P sample historical vectors from the 2N sample historical vectors, wherein P is a positive integer that is less than 2N;

wherein the classification information comprises P identifiers that identify P historical files of the historical files that are associated with the P sample historical vectors, contents of the P historical files, P AI prompts requesting that the AI model choose between the malicious class and the non-malicious class and further requesting explanations that describe reasonings used by the AI model in choosing the malicious class or the non-malicious class, and P responses to the P AI prompts from the AI model; and wherein the P responses comprise indications of selected classes in which the AI model classifies the P historical files and further comprise the explanations that describe the reasonings used by the AI model in choosing the selected classes, wherein a selected class is the malicious class or the non-malicious class.

11. The system of claim 1, wherein the computer-executable instructions are executable by the processor system to at least:

cause the AI model to classify the target file, to provide the explanation, and to provide an indication of a confidence associated with a classification of the target file in the malicious class or the non-malicious class, wherein the AI prompt further requests the indication of the confidence associated with the classification of the target file in the malicious class or the non-malicious class, and wherein the response further comprises the indication of the confidence associated with the classification of the target file in the selected class; and provide the indication of the confidence, which is associated with the classification of the target file in the selected class, to the user via the user interface.

12. A method implemented by a computing system, the method comprising:

generating a target vector based at least on an identifier that identifies a target file, content of the target file, and an AI prompt;

determining extents to which historical vectors associated with historical files, which are previously classified by an AI model, correspond to the target vector;

selecting a first historical vector based at least on the extent to which the first historical vector corresponds to the target vector being greater than or equal to an extent threshold;

causing the AI model to perform classification of the target file with regard to maliciousness and to provide an explanation that describes reasoning used by the AI model in performing the classification by providing the AI prompt together with the target file and classification information associated with the first historical vector as inputs to the AI model, the AI prompt requesting the classification of the target file and further requesting the explanation;

receiving a response to the AI prompt from the AI model, the response comprising an indication of a selected class in which the AI model classifies the target file and further comprising the explanation that describes the reasoning used by the AI model in classifying the target file in the selected class, wherein the selected class is a malicious class or a non-malicious class;

storing the explanation, which describes the reasoning used by the AI model in classifying the target file in the selected class; and based at least on the indication of the selected class in which the AI model classifies the target file, performing a security operation with regard to the target file.

13. The method of claim 12, wherein causing the AI model to perform the classification of the target file with regard to maliciousness comprises:

providing the AI prompt together with the target file and contextual information regarding the target file as inputs to the AI model, wherein the contextual information comprises at least one of the following:

an indication of a signor that signs the target file;

an indication of a publisher that publishes the target file;

a certificate associated with the target file;

at least one of a header byte associated with the target file or a footer byte associated with the target file; or an indication of behavior associated with the target file.

14. The method of claim 12, further comprising:

storing classification information in a store, wherein the classification information comprises a reference identifier that identifies a reference file, reference content of the reference file, a reference AI prompt requesting classification of the reference file with regard to maliciousness and further requesting a reference explanation that describes reference reasoning used by the AI model in performing the classification of the reference file, and a reference response to the reference AI prompt, wherein the reference response comprises an indication of a reference class in which the reference file is classified and further comprises the reference explanation that describes the reference reasoning for classifying the reference file in the reference class, wherein the reference class is the malicious class or the non-malicious class; and in response to storing the classification information in the store, determining that the target file is to be classified among a plurality of classes that comprises the malicious class and the non-malicious class;

wherein causing the AI model to perform the classification of the target file comprises:

causing the AI model to perform the classification of the target file with regard to maliciousness and to provide the explanation that describes the reasoning used by the AI model in performing the classification of the target file by providing the AI prompt together with the target file and the classification information to the AI model.

15. The method of claim 12, wherein the historical vectors are based at least on identifiers that identify the historical files, contents of the historical files, and AI prompts requesting classifications of the historical files with regard to maliciousness and further requesting explanations that describe reasonings used by the AI model in performing the classifications; and wherein the classification information comprises a first identifier that identifies a first historical file of the historical files that is associated with the first historical vector, first content of the first historical file, a first AI prompt requesting classification of the first historical file with regard to maliciousness and further requesting a first explanation that describes a first reasoning used by the AI model in performing the classification of the first historical file, and a first response to the first AI prompt from the AI model, and wherein the first response comprises an indication of a first class in which the AI model classifies the first historical file and further comprises the first explanation that describes the first reasoning used by the AI model in performing the classification of the first historical file, wherein the first class is the malicious class or the non-malicious class.

16. The method of claim 15, wherein the historical vectors are further based at least on confidences associated with the classifications of the historical files with regard to maliciousness; and wherein selecting the first historical vector from the historical vectors comprises:

selecting the first historical vector from the historical vectors based at least on the extent to which the first historical vector corresponds to the target vector being greater than or equal to the extent threshold and further based at least on a first confidence of the confidences that is associated with a first classification of the first historical file with regard to maliciousness being greater than or equal to a confidence threshold.

17. The method of claim 15, further comprising:

selecting a second historical vector from the historical vectors based at least on the extent to which the second historical vector corresponds to the target vector being greater than or equal to the extent threshold, wherein the classification information further comprises a second identifier that identifies a second historical file of the historical files that is associated with the second historical vector, second content of the second historical file, a second AI prompt requesting classification of the second historical file with regard to maliciousness and further requesting a second explanation that describes a second reasoning used by the AI model in performing the classification of the second historical file, and a second response to the second AI prompt from the AI model, and wherein the second response comprises an indication of a second class in which the AI model classifies the second historical file and further comprises the second explanation that describes the second reasoning used by the AI model in performing the classification of the second historical file, wherein the second class is the malicious class or the non-malicious class.

18. The method of claim 17, wherein the first response indicates that the first historical file is classified in the malicious class;

wherein the second response indicates that the second historical file is classified in the non-malicious class; and wherein providing the AI prompt together with the target file and the classification information to the AI model comprises:

based at least on the first response indicating that the first historical file is classified in the malicious class and further based at least on the second response indicating that the second historical file is classified in the non-malicious class, causing the AI model to process the first historical file prior to processing the second historical file.

19. The method of claim 17, wherein the first response indicates that the first historical file is classified in the non-malicious class;

wherein the second response indicates that the second historical file is classified in the malicious class; and wherein providing the AI prompt together with the target file and the classification information to the AI model comprises:

based at least on the first response indicating that the first historical file is classified in the non-malicious class and further based at least on the second response indicating that the second historical file is classified in the malicious class, causing the AI model to process the first historical file prior to processing the second historical file.

20. The method of claim 12, wherein the historical vectors are based at least on identifiers that identify the historical files, contents of the historical files, and AI prompts requesting classifications of the historical files with regard to maliciousness and further requesting explanations that describe reasonings used by the AI model in performing the classifications;

wherein selecting the first historical vector comprises:

selecting N first historical vectors, which are associated with historical files that are classified in the malicious class, and N second historical vectors, which are associated with historical files that are classified in the non-malicious class, from the historical vectors to provide 2N sample historical vectors based at least on the extents to which the N first historical vectors and the N second historical vectors correspond to the target vector being greater than or equal to an extent threshold, wherein N is a positive integer; and selecting P sample historical vectors from the 2N sample historical vectors, wherein P is a positive integer that is less than 2N;

wherein the classification information comprises P identifiers that identify P historical files of the historical files that are associated with the P sample historical vectors, contents of the P historical files, P AI prompts requesting classifications of the P historical files with regard to maliciousness and further requesting explanations that describe reasonings used by the AI model in performing the classifications of the P historical files, and P responses to the P AI prompts from the AI model; and wherein the P responses comprise indications of selected classes in which the AI model classifies the P historical files and further comprise the explanations that describe the reasonings used by the AI model in performing the classifications of the P historical files, wherein a selected class is the malicious class or the non-malicious class.

21. The method of claim 12, wherein causing the AI model to perform the classification of the target file and to provide the explanation comprises:

causing the AI model to perform the classification of the target file with regard to maliciousness, to provide the explanation, and to provide an indication of a confidence associated with the classification of the target file;

wherein the AI prompt further requests the indication of the confidence associated with the classification of the target file;

wherein the response further comprises the indication of the confidence associated with the classification of the target file in the selected class; and wherein the method further comprises:

providing the indication of the confidence, which is associated with the classification of the target file in the selected class, to a user via a user interface.

22. A computer program product comprising a computer-readable storage medium having instructions recorded thereon for enabling a processor-based system to perform operations, the operations comprising:

generating a target vector based at least on an identifier that identifies a target file, content of the target file, and an AI prompt;

determining extents to which historical vectors associated with historical files, which are previously classified by an AI model, correspond to the target vector;

selecting a first historical vector based at least on the extent to which the first historical vector corresponds to the target vector being greater than or equal to an extent threshold;

causing the AI model to classify the target file in a malicious class or a non-malicious class and to provide an explanation that describes reasoning used by the AI model in choosing the malicious class or the non-malicious class and to provide an indication of a confidence associated with a classification of the target file in the malicious class or the non-malicious class by providing the AI prompt together with the target file and classification information associated with the first historical vector as inputs to the AI model, the AI prompt requesting that the AI model choose between the malicious class and the non-malicious class and further requesting the explanation that describes the reasoning used by the AI model in choosing the malicious class or the non-malicious class and further requesting the indication of the confidence associated with the classification of the target file in the malicious class or the non-malicious class;

receiving a response to the AI prompt from the AI model, the response comprising an indication of a selected class in which the AI model classifies the target file and further comprising the explanation that describes the reasoning used by the AI model in choosing the selected class and further comprising the indication of the confidence associated with the classification of the target file in the selected class, wherein the selected class is the malicious class or the non-malicious class;

providing the explanation, which describes the reasoning used by the AI model in choosing the selected class, and the indication of the confidence, which is associated with the classification of the target file in the selected class, to a user via a user interface; and based at least on the indication of the selected class in which the AI model classifies the target file, performing a security operation with regard to the target file.

* * * * *